(12) United States Patent
Acocella et al.

(10) Patent No.: US 8,711,156 B1
(45) Date of Patent: Apr. 29, 2014

(54) METHOD AND SYSTEM FOR REMAPPING PROCESSING ELEMENTS IN A PIPELINE OF A GRAPHICS PROCESSING UNIT

(75) Inventors: Dominic Acocella, Blainville (CA); Timothy J. McDonald, Austin, TX (US); Robert W. Gimby, West Bloomfield, MI (US); Thomas H. Kong, Los Altos, CA (US)

(73) Assignee: Nvidia Corporation, Santa Clara, CA (US)

( * ) Notice: Subject to any disclaimer, the term of this patent is extended or adjusted under 35 U.S.C. 154(b) by 644 days.

(21) Appl. No.: 10/956,609

(22) Filed: Sep. 30, 2004

(51) Int. Cl.
 *G06T 1/20* (2006.01)
 *G06F 12/10* (2006.01)

(52) U.S. Cl.
 USPC .......................................... 345/506; 345/568

(58) Field of Classification Search
 USPC ................................................. 345/506, 568
 See application file for complete search history.

(56) References Cited

U.S. PATENT DOCUMENTS

| | | |
|---|---|---|
| 3,940,740 A | 2/1976 | Coontz |
| 4,208,810 A | 6/1980 | Rohner et al. |
| 4,449,730 A | 5/1984 | Oberleitner et al. |
| 4,541,075 A | 9/1985 | Dill et al. |
| 4,773,044 A | 9/1988 | Sfarti et al. |
| 4,885,703 A | 12/1989 | Deering |
| 4,918,626 A | 4/1990 | Watkins et al. |
| 4,949,280 A | 8/1990 | Littlefield |
| 4,951,220 A | 8/1990 | Ramacher et al. |
| 4,985,988 A | 1/1991 | Littlebury |
| 5,036,473 A | 7/1991 | Butts et al. |
| 5,081,594 A | 1/1992 | Horsley |
| 5,125,011 A | 6/1992 | Fung |
| 5,276,893 A | 1/1994 | Savaria |
| 5,287,438 A | 2/1994 | Kelleher |
| 5,303,334 A | 4/1994 | Snyder et al. |
| 5,313,287 A | 5/1994 | Barton |
| 5,379,405 A | 1/1995 | Ostrowski |

(Continued)

FOREIGN PATENT DOCUMENTS

| | | |
|---|---|---|
| CN | 101093578 | 12/2007 |
| JP | 61020348 A | 1/1986 |

(Continued)

OTHER PUBLICATIONS

Eckert, et al; Functional Component Coordinated Reconfiguration System and Method; U.S. Appl. No. 11/454,313; filed Jun. 16, 2006.

(Continued)

*Primary Examiner* — Kee M Tung
*Assistant Examiner* — Zhengxi Liu

(57) ABSTRACT

A method and system for remapping units that are disabled to active units in a 3-D graphics pipeline. Specifically, in one embodiment, a method remaps processing elements in a pipeline of a graphics pipeline unit. Graphical input data are received. Then the number of enabled processing elements are determined from a plurality of processing elements. Each of the enabled processing elements are virtually addressed above a translator to virtually process the graphical input data. Then, the virtual addresses of each of the enabled processing elements are mapped to physical addresses of the enabled processing elements at the translator. The graphical input data are physically processed at the physical addresses of the enabled processing elements. In addition, each of the enabled processing elements are physically addressed below the translator to further process the graphical input data.

29 Claims, 6 Drawing Sheets

(56) References Cited

U.S. PATENT DOCUMENTS

| | | | |
|---|---|---|---|
| 5,392,437 A | 2/1995 | Matter et al. | |
| 5,400,777 A | 3/1995 | Olsson et al. | |
| 5,408,606 A | 4/1995 | Eckart | |
| 5,432,898 A | 7/1995 | Curb et al. | |
| 5,446,836 A | 8/1995 | Lentz et al. | |
| 5,448,496 A | 9/1995 | Butts et al. | |
| 5,452,104 A | 9/1995 | Lee | |
| 5,452,412 A | 9/1995 | Johnson, Jr. et al. | |
| 5,455,536 A | 10/1995 | Kono et al. | |
| 5,483,258 A | 1/1996 | Cornett et al. | |
| 5,498,975 A * | 3/1996 | Cliff et al. | 326/10 |
| 5,513,144 A | 4/1996 | O'Toole | |
| 5,513,354 A | 4/1996 | Dwork et al. | |
| 5,517,666 A * | 5/1996 | Ohtani et al. | 712/3 |
| 5,530,457 A | 6/1996 | Helgeson | |
| 5,543,935 A | 8/1996 | Harrington | |
| 5,570,463 A | 10/1996 | Dao | |
| 5,574,847 A | 11/1996 | Eckart et al. | |
| 5,578,976 A | 11/1996 | Yao | |
| 5,594,854 A | 1/1997 | Baldwin et al. | |
| 5,613,050 A | 3/1997 | Hochmuth et al. | |
| 5,623,692 A | 4/1997 | Priem et al. | |
| 5,630,171 A | 5/1997 | Chejlava, Jr. et al. | |
| 5,633,297 A | 5/1997 | Valko et al. | |
| 5,634,107 A | 5/1997 | Yumoto et al. | |
| 5,638,946 A | 6/1997 | Zavracky | |
| 5,664,162 A | 9/1997 | Dye | |
| 5,671,376 A | 9/1997 | Bucher et al. | |
| 5,694,143 A | 12/1997 | Fielder et al. | |
| 5,705,938 A | 1/1998 | Kean | |
| 5,766,979 A | 6/1998 | Budnaitis | |
| 5,768,178 A | 6/1998 | McLaury | |
| 5,778,348 A | 7/1998 | Manduley et al. | |
| 5,805,833 A | 9/1998 | Verdun | |
| 5,809,230 A | 9/1998 | Pereira | |
| 5,815,162 A | 9/1998 | Levine | |
| 5,821,949 A | 10/1998 | Deering | |
| 5,854,631 A | 12/1998 | Akeley et al. | |
| 5,854,637 A | 12/1998 | Sturges | |
| 5,872,902 A | 2/1999 | Kuchkuda et al. | |
| 5,884,053 A | 3/1999 | Clouser et al. | |
| 5,896,391 A | 4/1999 | Solheim et al. | |
| 5,909,595 A | 6/1999 | Rosenthal et al. | |
| 5,913,218 A | 6/1999 | Carney et al. | |
| 5,937,173 A | 8/1999 | Olarig et al. | |
| 5,956,252 A | 9/1999 | Lau et al. | |
| 5,956,505 A | 9/1999 | Manduley | |
| 5,968,175 A | 10/1999 | Morishita et al. | |
| 5,977,987 A | 11/1999 | Duluk, Jr. | |
| 5,996,996 A | 12/1999 | Brunelle | |
| 5,999,990 A | 12/1999 | Sharrit et al. | |
| 6,003,100 A | 12/1999 | Lee | |
| 6,028,608 A | 2/2000 | Jenkins | |
| 6,034,699 A | 3/2000 | Wong et al. | |
| 6,038,348 A | 3/2000 | Carley | |
| 6,049,870 A | 4/2000 | Greaves | |
| 6,065,131 A | 5/2000 | Andrews et al. | |
| 6,067,262 A | 5/2000 | Irrinki et al. | |
| 6,067,633 A | 5/2000 | Robbins et al. | |
| 6,069,540 A | 5/2000 | Berenz et al. | |
| 6,072,500 A | 6/2000 | Foran et al. | |
| 6,072,686 A | 6/2000 | Yarbrough | |
| 6,085,269 A | 7/2000 | Chan et al. | |
| 6,094,116 A | 7/2000 | Tai et al. | |
| 6,098,118 A | 8/2000 | Ellenby et al. | |
| 6,104,407 A | 8/2000 | Aleksic et al. | |
| 6,104,417 A | 8/2000 | Nielsen et al. | |
| 6,115,049 A | 9/2000 | Winner et al. | |
| 6,118,394 A | 9/2000 | Onaya | |
| 6,128,000 A | 10/2000 | Jouppi et al. | |
| 6,129,070 A | 10/2000 | Jingu et al. | |
| 6,137,918 A | 10/2000 | Harrington et al. | |
| 6,160,557 A | 12/2000 | Narayanaswami | |
| 6,160,559 A | 12/2000 | Omtzigt | |
| 6,184,888 B1 | 2/2001 | Yuasa et al. | |
| 6,188,394 B1 | 2/2001 | Morein et al. | |
| 6,201,545 B1 | 3/2001 | Wong et al. | |
| 6,204,859 B1 | 3/2001 | Jouppi et al. | |
| 6,219,070 B1 | 4/2001 | Baker et al. | |
| 6,219,628 B1 | 4/2001 | Kodosky et al. | |
| 6,249,288 B1 | 6/2001 | Campbell | |
| 6,249,853 B1 | 6/2001 | Porterfield | |
| 6,255,849 B1 | 7/2001 | Mohan | |
| 6,259,460 B1 | 7/2001 | Gossett et al. | |
| 6,307,169 B1 | 10/2001 | Sun et al. | |
| 6,317,804 B1 | 11/2001 | Levy et al. | |
| 6,323,699 B1 | 11/2001 | Quiet | |
| 6,323,874 B1 | 11/2001 | Gossett | |
| 6,348,811 B1 | 2/2002 | Haycock et al. | |
| 6,359,623 B1 | 3/2002 | Larson | |
| 6,362,819 B1 | 3/2002 | Dalal et al. | |
| 6,363,285 B1 | 3/2002 | Wey | |
| 6,363,295 B1 | 3/2002 | Akram et al. | |
| 6,366,289 B1 | 4/2002 | Johns | |
| 6,370,603 B1 | 4/2002 | Silverman et al. | |
| 6,377,898 B1 | 4/2002 | Steffan et al. | |
| 6,388,590 B1 | 5/2002 | Ng | |
| 6,389,585 B1 | 5/2002 | Masleid et al. | |
| 6,392,431 B1 | 5/2002 | Jones | |
| 6,429,288 B1 | 8/2002 | Esswein et al. | |
| 6,429,747 B2 | 8/2002 | Franck et al. | |
| 6,429,877 B1 | 8/2002 | Stroyan | |
| 6,433,657 B1 | 8/2002 | Chen | |
| 6,437,780 B1 | 8/2002 | Baltaretu et al. | |
| 6,452,595 B1 | 9/2002 | Montrym et al. | |
| 6,469,707 B1 | 10/2002 | Voorhies | |
| 6,480,205 B1 | 11/2002 | Greene et al. | |
| 6,486,425 B2 | 11/2002 | Seki | |
| 6,501,564 B1 | 12/2002 | Schramm et al. | |
| 6,504,542 B1 | 1/2003 | Voorhies et al. | |
| 6,504,841 B1 | 1/2003 | Larson et al. | |
| 6,522,329 B1 | 2/2003 | Ihara et al. | |
| 6,525,737 B1 | 2/2003 | Duluk, Jr. et al. | |
| 6,529,207 B1 | 3/2003 | Landau et al. | |
| 6,530,045 B1 | 3/2003 | Cooper et al. | |
| 6,535,986 B1 | 3/2003 | Rosno et al. | |
| 6,598,194 B1 | 7/2003 | Madge et al. | |
| 6,606,093 B1 | 8/2003 | Gossett et al. | |
| 6,611,272 B1 | 8/2003 | Hussain et al. | |
| 6,614,444 B1 | 9/2003 | Duluk, Jr. et al. | |
| 6,614,448 B1 | 9/2003 | Garlick et al. | |
| 6,624,823 B2 | 9/2003 | Deering | |
| 6,629,181 B1 | 9/2003 | Alappat et al. | |
| 6,633,197 B1 | 10/2003 | Sutardja | |
| 6,633,297 B2 | 10/2003 | McCormack et al. | |
| 6,636,212 B1 | 10/2003 | Zhu | |
| 6,646,639 B1 | 11/2003 | Greene et al. | |
| 6,662,133 B2 | 12/2003 | Engel et al. | |
| 6,671,000 B1 | 12/2003 | Cloutier | |
| 6,683,617 B1 | 1/2004 | Naoi et al. | |
| 6,693,637 B2 | 2/2004 | Koneru et al. | |
| 6,693,639 B2 | 2/2004 | Duluk, Jr. et al. | |
| 6,697,063 B1 | 2/2004 | Zhu | |
| 6,700,581 B2 | 3/2004 | Baldwin et al. | |
| 6,701,466 B1 | 3/2004 | Fiedler | |
| 6,714,258 B2 | 3/2004 | Stessen et al. | |
| 6,717,474 B2 | 4/2004 | Chen et al. | |
| 6,717,576 B1 | 4/2004 | Duluk, Jr. et al. | |
| 6,717,578 B1 | 4/2004 | Deering | |
| 6,718,496 B1 | 4/2004 | Fukuhisa et al. | |
| 6,734,770 B2 | 5/2004 | Aigner et al. | |
| 6,734,861 B1 | 5/2004 | Van Dyke et al. | |
| 6,738,856 B1 | 5/2004 | Milley et al. | |
| 6,741,247 B1 | 5/2004 | Fenney | |
| 6,741,258 B1 | 5/2004 | Peck, Jr. et al. | |
| 6,741,528 B1 | 5/2004 | Peck et al. | |
| 6,742,000 B1 | 5/2004 | Fantasia et al. | |
| 6,747,057 B2 | 6/2004 | Ruzafa et al. | |
| 6,747,483 B2 | 6/2004 | To et al. | |
| 6,765,575 B1 | 7/2004 | Voorhies et al. | |
| 6,778,177 B1 | 8/2004 | Furtner | |
| 6,782,587 B2 | 8/2004 | Reilly | |
| 6,785,841 B2 | 8/2004 | Akrout et al. | |
| 6,788,101 B1 | 9/2004 | Rahman | |

(56) References Cited

U.S. PATENT DOCUMENTS

| | | |
|---|---|---|
| 6,788,301 B2 | 9/2004 | Thrasher |
| 6,794,101 B2 | 9/2004 | Liu et al. |
| 6,798,410 B1 | 9/2004 | Redshaw et al. |
| 6,803,782 B2 * | 10/2004 | Koob et al. .............. 326/10 |
| 6,803,916 B2 | 10/2004 | Ramani et al. |
| 6,806,788 B1 | 10/2004 | Marumoto |
| 6,819,332 B2 | 11/2004 | Baldwin |
| 6,823,283 B2 | 11/2004 | Steger et al. |
| 6,825,847 B1 | 11/2004 | Molnar et al. |
| 6,833,835 B1 | 12/2004 | van Vugt |
| 6,849,924 B2 | 2/2005 | Allison et al. |
| 6,850,133 B2 | 2/2005 | Ma |
| 6,861,865 B1 * | 3/2005 | Carlson .............. 326/10 |
| 6,862,027 B2 | 3/2005 | Andrews et al. |
| 6,879,207 B1 | 4/2005 | Nickolls |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,961,065 B2 | 11/2005 | Sasaki |
| 6,978,317 B2 | 12/2005 | Anantha et al. |
| 6,982,718 B2 | 1/2006 | Kilgard et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,020,598 B1 | 3/2006 | Jacobson |
| 7,023,437 B1 | 4/2006 | Voorhies et al. |
| 7,027,047 B2 | 4/2006 | Kim et al. |
| 7,043,622 B2 * | 5/2006 | Henry et al. .............. 711/203 |
| 7,058,738 B2 | 6/2006 | Stufflebeam, Jr. |
| 7,061,495 B1 | 6/2006 | Leather |
| 7,064,771 B1 | 6/2006 | Jouppi et al. |
| 7,069,369 B2 | 6/2006 | Chou et al. |
| 7,069,458 B1 | 6/2006 | Sardi et al. |
| 7,069,558 B1 | 6/2006 | Stone et al. |
| 7,075,542 B1 * | 7/2006 | Leather .............. 345/506 |
| 7,075,797 B1 | 7/2006 | Leonard et al. |
| 7,081,902 B1 | 7/2006 | Crow et al. |
| 7,085,824 B2 | 8/2006 | Forth et al. |
| 7,119,809 B1 | 10/2006 | McCabe |
| 7,124,318 B2 * | 10/2006 | Luick .............. 714/10 |
| 7,126,600 B1 | 10/2006 | Fowler et al. |
| 7,136,953 B1 | 11/2006 | Bisson et al. |
| 7,154,066 B2 | 12/2006 | Talwar et al. |
| 7,158,148 B2 | 1/2007 | Toji et al. |
| 7,170,315 B2 | 1/2007 | Bakker et al. |
| 7,170,515 B1 | 1/2007 | Zhu |
| 7,174,407 B2 | 2/2007 | Hou et al. |
| 7,174,411 B1 | 2/2007 | Ngai |
| 7,184,040 B1 | 2/2007 | Tzvetkov |
| 7,185,135 B1 | 2/2007 | Briggs et al. |
| 7,185,225 B2 * | 2/2007 | Sutardja et al. .............. 714/11 |
| 7,187,383 B2 * | 3/2007 | Kent .............. 345/505 |
| 7,224,364 B1 | 5/2007 | Yue et al. |
| 7,246,274 B2 | 7/2007 | Kizer et al. |
| 7,260,007 B2 | 8/2007 | Jain et al. |
| RE39,898 E | 10/2007 | Nally et al. |
| 7,293,127 B2 | 11/2007 | Caruk |
| 7,305,571 B2 | 12/2007 | Cranford, Jr. et al. |
| 7,307,628 B1 | 12/2007 | Goodman et al. |
| 7,307,638 B2 | 12/2007 | Leather et al. |
| 7,324,458 B2 | 1/2008 | Schoenborn et al. |
| 7,340,541 B2 | 3/2008 | Castro et al. |
| 7,362,325 B2 | 4/2008 | Anderson |
| 7,373,547 B2 | 5/2008 | Sutardja et al. |
| 7,382,368 B1 | 6/2008 | Molnar et al. |
| 7,398,336 B2 | 7/2008 | Feng et al. |
| 7,414,636 B2 | 8/2008 | Kokojima et al. |
| 7,415,551 B2 | 8/2008 | Pescatore |
| 7,424,564 B2 | 9/2008 | Mehta et al. |
| 7,437,021 B2 | 10/2008 | Satoh |
| 7,446,770 B2 | 11/2008 | Kokojima et al. |
| 7,453,466 B2 | 11/2008 | Hux et al. |
| 7,480,808 B2 | 1/2009 | Caruk et al. |
| 7,483,029 B2 | 1/2009 | Crow et al. |
| 7,525,986 B2 | 4/2009 | Lee et al. |
| 7,548,996 B2 | 6/2009 | Baker et al. |
| 7,551,174 B2 | 6/2009 | Iourcha et al. |
| 7,594,061 B2 | 9/2009 | Shen et al. |
| 7,633,506 B1 | 12/2009 | Leather et al. |
| 7,634,637 B1 | 12/2009 | Lindholm et al. |
| 7,663,633 B1 | 2/2010 | Diamond et al. |
| 7,782,325 B2 | 8/2010 | Gonzalez et al. |
| 7,791,617 B2 | 9/2010 | Crow et al. |
| 7,793,029 B1 | 9/2010 | Parson et al. |
| 7,965,902 B1 | 6/2011 | Zelinka et al. |
| 8,063,903 B2 | 11/2011 | Vignon et al. |
| 8,132,015 B1 | 3/2012 | Wyatt |
| 8,144,166 B2 | 3/2012 | Lyapunov et al. |
| 8,237,738 B1 | 8/2012 | Crow |
| 8,412,872 B1 | 4/2013 | Wagner et al. |
| 8,417,838 B2 | 4/2013 | Tamasi et al. |
| 8,482,567 B1 | 7/2013 | Moreton et al. |
| 8,532,098 B2 | 9/2013 | Reed et al. |
| 2001/0005209 A1 | 6/2001 | Lindholm et al. |
| 2002/0005729 A1 | 1/2002 | Leedy |
| 2002/0026623 A1 | 2/2002 | Morooka |
| 2002/0031025 A1 | 3/2002 | Shimano et al. |
| 2002/0050979 A1 | 5/2002 | Oberoi et al. |
| 2002/0059392 A1 | 5/2002 | Ellis, III |
| 2002/0087833 A1 | 7/2002 | Burns et al. |
| 2002/0091979 A1 | 7/2002 | Cooke et al. |
| 2002/0097241 A1 | 7/2002 | McCormack et al. |
| 2002/0120723 A1 | 8/2002 | Forth et al. |
| 2002/0130863 A1 | 9/2002 | Baldwin |
| 2002/0138750 A1 | 9/2002 | Gibbs et al. |
| 2002/0140655 A1 | 10/2002 | Liang et al. |
| 2002/0143653 A1 | 10/2002 | DiLena et al. |
| 2002/0158869 A1 | 10/2002 | Ohba et al. |
| 2002/0158885 A1 | 10/2002 | Brokenshire et al. |
| 2002/0196251 A1 | 12/2002 | Duluk, Jr. et al. |
| 2002/0199110 A1 | 12/2002 | Kean |
| 2003/0020173 A1 | 1/2003 | Huff et al. |
| 2003/0023771 A1 | 1/2003 | Erickson et al. |
| 2003/0046472 A1 | 3/2003 | Morrow |
| 2003/0051091 A1 | 3/2003 | Leung et al. |
| 2003/0058244 A1 | 3/2003 | Ramani et al. |
| 2003/0061409 A1 | 3/2003 | RuDusky |
| 2003/0067468 A1 | 4/2003 | Duluk, Jr. et al. |
| 2003/0076325 A1 | 4/2003 | Thrasher |
| 2003/0093506 A1 | 5/2003 | Oliver et al. |
| 2003/0101288 A1 | 5/2003 | Tague et al. |
| 2003/0115500 A1 | 6/2003 | Akrout et al. |
| 2003/0122815 A1 | 7/2003 | Deering |
| 2003/0160795 A1 | 8/2003 | Alcorn et al. |
| 2003/0163589 A1 | 8/2003 | Bunce et al. |
| 2003/0164830 A1 | 9/2003 | Kent |
| 2003/0179631 A1 | 9/2003 | Koob et al. |
| 2003/0194116 A1 | 10/2003 | Wong et al. |
| 2003/0201994 A1 | 10/2003 | Taylor et al. |
| 2004/0012082 A1 | 1/2004 | Dewey et al. |
| 2004/0012597 A1 | 1/2004 | Zatz et al. |
| 2004/0046764 A1 | 3/2004 | Lefebvre et al. |
| 2004/0064628 A1 | 4/2004 | Chiu |
| 2004/0085313 A1 | 5/2004 | Moreton et al. |
| 2004/0102187 A1 | 5/2004 | Moller et al. |
| 2004/0130552 A1 | 7/2004 | Duluk, Jr. et al. |
| 2004/0183148 A1 | 9/2004 | Blasko, III |
| 2004/0183801 A1 | 9/2004 | Deering |
| 2004/0188781 A1 | 9/2004 | Bar |
| 2004/0196285 A1 | 10/2004 | Rice et al. |
| 2004/0196290 A1 | 10/2004 | Satoh |
| 2004/0207642 A1 | 10/2004 | Crisu et al. |
| 2004/0225787 A1 | 11/2004 | Ma et al. |
| 2004/0227599 A1 | 11/2004 | Shen et al. |
| 2004/0246251 A1 | 12/2004 | Fenney et al. |
| 2005/0030314 A1 | 2/2005 | Dawson |
| 2005/0041031 A1 | 2/2005 | Diard |
| 2005/0041037 A1 | 2/2005 | Dawson |
| 2005/0044284 A1 | 2/2005 | Pescatore |
| 2005/0045722 A1 | 3/2005 | Park |
| 2005/0060601 A1 | 3/2005 | Gomm |

(56) References Cited

U.S. PATENT DOCUMENTS

| | | |
|---|---|---|
| 2005/0066148 A1 | 3/2005 | Luick |
| 2005/0088445 A1 | 4/2005 | Gonzalez et al. |
| 2005/0122338 A1 | 6/2005 | Hong et al. |
| 2005/0125629 A1* | 6/2005 | Kissell .............................. 712/1 |
| 2005/0134588 A1 | 6/2005 | Aila et al. |
| 2005/0134603 A1 | 6/2005 | Iourcha et al. |
| 2005/0172135 A1 | 8/2005 | Wiersma |
| 2005/0173233 A1 | 8/2005 | Kaelberer |
| 2005/0174353 A1 | 8/2005 | Alcorn et al. |
| 2005/0179698 A1 | 8/2005 | Vijayakumar et al. |
| 2005/0182881 A1 | 8/2005 | Chou et al. |
| 2005/0210472 A1* | 9/2005 | Accapadi et al. ............ 718/105 |
| 2005/0237083 A1 | 10/2005 | Bakker et al. |
| 2005/0246460 A1 | 11/2005 | Stufflebeam |
| 2005/0251358 A1 | 11/2005 | Van Dyke et al. |
| 2005/0259100 A1 | 11/2005 | Teruyama |
| 2005/0261863 A1 | 11/2005 | Van Dyke et al. |
| 2005/0275657 A1* | 12/2005 | Hutchins et al. ............. 345/506 |
| 2005/0275663 A1 | 12/2005 | Kokojima et al. |
| 2005/0285863 A1 | 12/2005 | Diamond |
| 2006/0033745 A1 | 2/2006 | Koselj et al. |
| 2006/0044317 A1 | 3/2006 | Bourd et al. |
| 2006/0053188 A1* | 3/2006 | Mantor et al. ................ 708/490 |
| 2006/0053189 A1* | 3/2006 | Mantor ......................... 708/490 |
| 2006/0055641 A1 | 3/2006 | Robertus et al. |
| 2006/0106911 A1 | 5/2006 | Chapple et al. |
| 2006/0123177 A1 | 6/2006 | Chan et al. |
| 2006/0132495 A1 | 6/2006 | Anderson |
| 2006/0170690 A1 | 8/2006 | Leather |
| 2006/0190663 A1 | 8/2006 | Lu |
| 2006/0203005 A1 | 9/2006 | Hunter |
| 2006/0221086 A1 | 10/2006 | Diard |
| 2006/0245001 A1 | 11/2006 | Lee et al. |
| 2006/0252285 A1 | 11/2006 | Shen |
| 2006/0267981 A1 | 11/2006 | Naoi |
| 2006/0267987 A1 | 11/2006 | Litchmanov |
| 2006/0282604 A1 | 12/2006 | Temkine et al. |
| 2007/0038794 A1 | 2/2007 | Purcell et al. |
| 2007/0050647 A1 | 3/2007 | Conroy et al. |
| 2007/0067535 A1 | 3/2007 | Liu |
| 2007/0088877 A1 | 4/2007 | Chen et al. |
| 2007/0115271 A1 | 5/2007 | Seo et al. |
| 2007/0115290 A1 | 5/2007 | Polzin et al. |
| 2007/0115291 A1 | 5/2007 | Chen et al. |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0198163 A1 | 8/2008 | Nakahashi et al. |
| 2008/0273218 A1 | 11/2008 | Kitora et al. |
| 2009/0044003 A1 | 2/2009 | Berthiaume et al. |

FOREIGN PATENT DOCUMENTS

| | | |
|---|---|---|
| JP | 4-266768 | 9/1992 |
| JP | 06-280758 | 6/1994 |
| JP | 06180758 | 6/1994 |
| JP | 07-141526 | 6/1995 |
| JP | 9-160840 | 6/1997 |
| JP | 09160840 A2 | 6/1997 |
| JP | 10-134198 | 5/1998 |
| JP | 11-195132 | 7/1999 |
| JP | 11328133 A | 11/1999 |
| JP | 2001-005989 | 1/2001 |
| JP | 2002076120 | 3/2002 |
| JP | 2005-182547 | 7/2005 |
| TW | 093127712 | 7/2005 |
| TW | I235341 | 7/2005 |
| WO | 00/13145 | 3/2000 |
| WO | 02/054224 A1 | 7/2002 |
| WO | 2005029329 | 3/2005 |
| WO | PCT/US2004/030127 | 3/2005 |

OTHER PUBLICATIONS

Diamond, A Semiconductor Die Micro Electro-Mechanical Switch Management System; U.S. Appl. No. 10/942,209; filed Sep. 15, 2004.

Diamond, et al; A System and Method for Remotely Configuring Semiconductor Functional Circuits; U.S. Appl. No. 10/740,779; filed Dec. 18, 2003.

Van Dyke, et al; A System and Method for Increasing Die Yield; U.S. Appl. No. 10/740,723; filed Dec. 18, 2003.

Diamond, et al; A System and Method for Configuring Semiconductor Functional Circuits; U.S. Appl. No. 10/740,722; filed Dec. 18, 2003.

Van Dyke, et al; An Integrated Circuit Configuration System and Method; U.S. Appl. No. 10/740,721; filed Dec. 18, 2003.

Diamond; Micro Electro Mechanical Switch System and Method for Testing and Configuring Semiconductor Functional Circuits; U.S. Appl. No. 10/942,169; filed Sep. 15, 2004.

Scotzniovsky, et al; Functional Component Compensation Reconfiguration System and Method; U.S. Appl. No. 11/472,865; filed Jun. 21, 2006.

Welsh, D.; "Building self-reconfiguring distributed systems using compensating reconfiguration"; Proceedings Fourth International Conference on Configurable Distributed Systems; May 4-6, 1998; pp. 18-25.

International Search Report. PCT/US2004/030127. Mail Date Jun. 30, 2005.

PCT International Preliminary Report on Patentability. PCT/US2004/030127. International Filing Date Sep. 13, 2004. Applicant: Nvidia Corporation. Date of Issuance of this Report: Mar. 16, 2006.

European Patent Office E-Space Family List for: WO 2005/029329 (PCT/US2004/030127).

Non-Final Office Action Dated Jan. 11, 2006; U.S. Appl. No. 10/740,722.

Non-Final Office Action Dated Oct. 11, 2006; U.S. Appl. No. 10/740,722.

Notice of Allowance Dated May 30, 2007; U.S. Appl. No. 10/740,722.

Notice of Allowance Dated Sep. 18, 2007; U.S. Appl. No. 10/740,722.

Notice of Allowance Dated Nov. 21, 2007; U.S. Appl. No. 10/740,722.

Notice of Allowance Dated Mar. 14, 2008; U.S. Appl. No. 10/740,722.

Notice of Allowance Dated Aug. 21, 2008; U.S. Appl. No. 10/740,722.

Notice of Allowance Dated Dec. 22, 2008; U.S. Appl. No. 10/740,722.

Notice of Allowance Dated Apr. 16, 2009; U.S. Appl. No. 10/740,722.

Non-Final Office Action Dated Feb. 11, 2005; U.S. Appl. No. 10/740,723.

Non-Final Office Action Dated Aug. 8, 2005; U.S. Appl. No. 10/740,723.

Final Office Action Dated Apr. 4, 2006; U.S. Appl. No. 10/740,723.

Non-Final Office Action Dated Sep. 28, 2006; U.S. Appl. No. 10/740,723.

Final Office Action Dated May 25, 2007; U.S. Appl. No. 10/740,723.

Non-Final Office Action Dated Jan. 16, 2008; U.S. Appl. No. 10/740,723.

Final Office Action Dated Jul. 7, 2008; U.S. Appl. No. 10/740,723.

Non-Final Office Action Dated Jan. 30, 2009; U.S. Appl. No. 10/740,723.

Non-Final Office Action Dated Jul. 14, 2005; U.S. Appl. No. 10/740,779.

Non-Final Office Action Dated Jan. 10, 2006; U.S. Appl. No. 10/740,779.

Final Office Action Dated Aug. 7, 2006; U.S. Appl. No. 10/740,779.

(56) References Cited

OTHER PUBLICATIONS

Non-Final Office Action Dated Mar. 26, 2007; U.S. Appl. No. 10/740,779.
Final Office Action Dated Dec. 6, 2007; U.S. Appl. No. 10/740,779.
Notice of Allowance Dated Jun. 9, 2008; U.S. Appl. No. 10/740,779.
Non-Final Office Action Dated Sep. 26, 2008; U.S. Appl. No. 10/740,779.
Notice of Allowance Dated Jul. 20, 2009; U.S. Appl. No. 10/740,779.
Non-Final Office Action Dated Oct. 5, 2006; U.S. Appl. No. 10/876,340.
Final Office Action Dated May 23, 2007; U.S. Appl. No. 10/876,340.
Notice Ofallowance Dated Dec. 4, 2007; U.S. Appl. No. 10/876,340.
Notice Ofallowance Dated Apr. 29, 2008; U.S. Appl. No. 10/876,340.
Notice Ofallowance Dated Sep. 4, 2008; U.S. Appl. No. 10/876,340.
Notice Ofallowance Dated Jan. 12, 2009; U.S. Appl. No. 10/876,340.
Notice Ofallowance Dated May 14, 2009; U.S. Appl. No. 10/876,340.
Non-Final Office Action Dated Feb. 9, 2007; U.S. Appl. No. 10/942,169.
Notice of Allowance Dated Aug. 10, 2007; U.S. Appl. No. 10/942,169.
Notice of Allowance Dated Nov. 21, 2007; U.S. Appl. No. 10/942,169.
Notice of Allowance Dated Mar. 18, 2008; U.S. Appl. No. 10/942,169.
Notice of Allowance Dated Aug. 8, 2008; U.S. Appl. No. 10/942,169.
Notice of Allowance Dated Nov. 28, 2008; U.S. Appl. No. 10/942,169.
Notice of Allowance Dated Apr. 24, 2009; U.S. Appl. No. 10/942,169.
Non-Final Office Action Dated Feb. 6, 2006; U.S. Appl. No. 10/942,209.
Final Office Action Dated Sep. 11, 2006; U.S. Appl. No. 10/942,209.
Non-Final Office Action Dated Mar. 29, 2007; U.S. Appl. No. 10/942,209.
Non-Final Office Action Dated Dec. 21, 2007; U.S. Appl. No. 10/942,209.
Non-Final Office Action Dated Jul. 14, 2008; U.S. Appl. No. 10/942,209.
Final Office Action Dated Mar. 17, 2009; U.S. Appl. No. 10/942,209.
Non-Final Office Action Dated Dec. 23, 2008; U.S. Appl. No. 12/005,691.
Final Office Action Dated Jul. 8, 2009; U.S. Appl. No. 12/005,691.
Non-Final Office Action Dated Mar. 10, 2008; U.S. Appl. No. 11/474,161.
Final Office Action Dated Sep. 17, 2008; U.S. Appl. No. 11/474,161.
Non-Final Office Action Dated Feb. 20, 2009; U.S. Appl. No. 11/474,161.
Notice of Allowance, Mail Date Apr. 29, 2008; U.S. Appl. No. 10/876,340.
Final Office Action, Mail Date May 23, 2007; U.S. Appl. No. 10/876,340.
Notice of Allowance, Mail Date Sep. 4, 2008; U.S. Appl. No. 10/876,340.
Notice of Allowance, Mail Date Dec. 4, 2007; U.S. Appl. No. 10/876,340.
Notice of Allowance, Mail Date Jan. 12, 2009; U.S. Appl. No. 10/876,340.
Notice of Allowance, Mail Date May 14, 2009; U.S. Appl. No. 10/876,340.
Notice of Allowance, Mail Date Sep. 10, 2009; U.S. Appl. No. 10/876,340.
Non-Final Office Action Dated Mar. 13, 2009; U.S. Appl. No. 11/454,313.
Non-Final Office Action Dated Dec. 3, 2008; U.S. Appl. No. 10/942,169.
Non-Final Office Action Dated Mar. 17, 2008; U.S. Appl. No. 11/474,027.
Final Office Action Dated Oct. 8, 2008; U.S. Appl. No. 11/474,027.
Non-Final Office Action Dated Mar. 19, 2009; U.S. Appl. No. 11/474,027.
Non-Final Office Action Dated Nov. 14, 2007; U.S. Appl. No. 10/740,721
Non-Final Office Action Dated Jul. 24, 2008; U.S. Appl. No. 10/740,721
Final Office Action Dated Apr. 30, 2009; U.S. Appl. No. 10/740,721
Non-Final Office Action Dated Aug. 5, 2009; U.S. Appl. No. 10/942,209
Non Final Office Action, Mail Date Oct. 5, 2006; U.S. Appl. No. 10/876,340.
Notice of Allowance Dated Aug. 21, 2009; U.S. Appl. No. 10/740,722.
Notice of Allowance Dated Dec. 17, 2009; U.S. Appl. No. 10/740,722.
Notice of Allowance Dated Oct. 8, 2009; U.S. Appl. No. 10/740,723.
Notice of Allowance Dated Nov. 13, 2009; U.S. Appl. No. 10/740,779.
Notice of Allowance Dated Sep. 10, 2009; U.S. Appl. No. 10/876,340.
Notice of Allowance Dated Dec. 29, 2009; U.S. Appl. No. 10/876,340.
Notice of Allowance Dated Aug. 20, 2009; U.S. Appl. No. 10/942,169.
Notice of Allowance Dated Dec. 16, 2009; U.S. Appl. No. 10/942,169.
Non-Final Office Action Dated Oct. 27, 2009; U.S. Appl. No. 12/005,691.
Non-Final Office Action Dated Sep. 14, 2009; U.S. Appl. No. 11/454,313.
Final Office Action Dated Sep. 4, 2009; U.S. Appl. No. 11/472,865.
Final Office Action Dated Aug. 20, 2009; U.S. Appl. No. 11/474,161.
Final Office Action Dated Oct. 14, 2009; U.S. Appl. No. 11/474,027.
Patent Application As Filed for U.S. Appl. No. 10/876,340; Inventor: Michael B. Diamond; filed Jun. 23, 2004.
Patent Application As Filed for U.S. Appl. No. 12/005,691; Inventor: Michael B. Diamond; filed Dec. 28, 2007.
Patent Application As Filed for U.S. Appl. No. 11/474,161; Inventors: Legakis et al.; filed Jun. 23, 2006.
Patent Application As Filed for U.S. Appl. No. 11/474,027; Inventors: Steiner et al.; filed Jun. 23, 2006.
Notice of Allowance Dated Apr. 9, 2010; U.S. Appl. No. 10/740,722.
Notice of Allowance Dated Feb. 22, 2010; U.S. Appl. No. 10/740,723.
Notice of Allowance Dated Mar. 31, 2010; U.S. Appl. No. 10/740,779.
Notice of Allowance Dated Apr. 14, 2010; U.S. Appl. No. 10/876,340.
Notice of Allowance Dated Apr. 2, 2010; U.S. Appl. No. 10/942,169.
Final Office Action Dated Apr. 16, 2010; U.S. Appl. No. 10/942,209.
Non-Final Office Action Dated Aug. 5, 2009; U.S. Appl. No. 10/942,209.
Non-Final Office Action Dated Mar. 26, 2010; U.S. Appl. No. 11/454,313.
Non-Final Office Action Dated Feb. 3, 2010; U.S. Appl. No. 11/474,027.
Non-Final Office Action Dated Feb. 4, 2010; U.S. Appl. No. 11/474,161.
Final Office Action Dated Apr. 26, 2010; U.S. Appl. No. 12/005,691.
Non-Final Office Action Dated Nov. 10, 2009; U.S. Appl. No. 10/740,721.
Final Office Action Dated Jul. 12, 2010; U.S. Appl. No. 10/740,721.
Notice of Allowance Dated Aug. 19, 2010; U.S. Appl. No. 10/740,722.
Notice of Allowance Dated Jun. 14, 2010; U.S. Appl. No. 10/740,723.
Notice of Allowance Dated Aug. 19, 2010; U.S. Appl. No. 10/876,340.
Notice of Allowance Dated Jul. 23, 2010; U.S. Appl. No. 10/942,169.
Non-Final Office Action Dated Jun. 22, 2010; U.S. Appl. No. 11/472,865.
Notice of Allowance Dated Nov. 2, 2010; U.S. Appl. No. 10/942,169.

(56) References Cited

OTHER PUBLICATIONS

Examiner Interview Summary Report Dated Sep. 15, 2010; U.S. Appl. No. 10/942,209.
Notice of Allowance Dated Oct. 28, 2010; U.S. Appl. No. 10/942,209.
Final Office Action Dated Oct. 13, 2010; U.S. Appl. No. 11/454,313.
Notice of Allowance Date Mailed Sep. 29, 2010; U.S. Appl. No. 10/740,723.
Notice of Allowance Date Mailed Jul. 12, 2010; U.S. Appl. No. 10/740,779.
Notice of Allowance Date Mailed Oct. 28, 2010; U.S. Appl. No. 10/740,779.
Final Office Action Mail Date Sep. 16, 2010; U.S. Appl. No. 11/474,161.
Non-Final Office Action Mail Date Mar. 31, 2011; U.S. Appl. No. 11/474,161.
Final Office Action Mail Date Feb. 28, 2011; U.S. Appl. No. 10/740,721.
Notice of Allowance Date Mailed Apr. 27, 2011; U.S. Appl. No. 10/740,722.
Notice of Allowance Date Mailed Feb. 28, 2011; U.S. Appl. No. 10/740,723.
Notice of Allowance Date Mailed Jun. 23, 2011; U.S. Appl. No. 10/740,723.
Notice of Allowance Date Mailed Feb. 24, 2011; U.S. Appl. No. 10/740,779.
Notice of Allowance Date Mailed Jun. 24, 2011; U.S. Appl. No. 10/740,779.
Notice of Allowance Date Mailed Oct. 26, 2011; U.S. Appl. No. 10/740,723.
Notice of Allowance Date Mailed Aug. 26, 2011; U.S. Appl. No. 10/740,722.
Notice of Allowance Date Mailed Sep. 15, 2011; U.S. Appl. No. 10/876,340.
Notice of Allowance Date Mailed May 11, 2011; U.S. Appl. No. 10/876,340.
Notice of Allowance Date Mailed Oct. 20, 2011; U.S. Appl. No. 10/942,169.
Notice of Allowance Date Mailed Jul. 11, 2011; U.S. Appl. No. 10/942,169.
Notice of Allowance Date Mailed Sep. 9, 2011; U.S. Appl. No. 10/942,209.
Notice of Allowance Date Mailed May 26, 2011; U.S. Appl. No. 10/942,209.
Non-Final Office Action Mail Date Sep. 22, 2011; U.S. Appl. No. 11/454,313.
Non-Final Office Action Mail Date Sep. 30, 2011; U.S. Appl. No. 11/472,865.
Final Office Action Mail Date Oct. 12, 2011; U.S. Appl. No. 11/474,161.
Notice of Allowance Date Mailed Aug. 4, 2011; U.S. Appl. No. 12/005,691.
Notice of Allowance Date Mailed Apr. 14, 2011; U.S. Appl. No. 12/005,691.
Final Office Action Mail Date Apr. 15, 2011; U.S. Appl. No. 11/474,027.
Non-Final Office Action Mail Date Jan. 5, 2011; U.S. Appl. No. 11/474,027.
Final Office Action Mail Date Sep. 15, 2010; U.S. Appl. No. 11/474,027.
Non-Final Office Action Mail Date Feb. 3, 2010; U.S. Appl. No. 11/474,027.
Final Office Action Mail Date May 14, 2012; U.S. Appl. No. 11/454,313.
Non-Final Office Action Mail Date Mar. 20, 2012; U.S. Appl. No. 10/740,721.
Final Office Action Mail Date May 8, 2012; U.S. Appl. No. 11/472,865.
Non-Final Office Action Mail Date Jul. 18, 2012; U.S. Appl. No. 11/474,161.
Non-Final Office Action Mail Date Jul. 31, 2012; U.S. Appl. No. 11/474,027.
Blythe, David; OpenGL Section 3.4.1, "Basic Lin Segment Rasterization", Mar. 29, 1997, pp. 1-3.
Boyer et al., "Discrete Analysis for Antialiased Lines", Eurographics 2000, 4 pages.
Crow, Franklin C.; "The Use of Grayscale for Improved Raster Display of Vectors and Characters", University of Texas; Austin, Texas; This work was supported by the National Science Foundation under grant MCS 76-83889; pp. 1-5, (ACM Siggraph Computer Graphics vol. 12 Issue 3, Aug. 1978).
Foley, James D.; "Computer Graphics: Principles and Practice", 1990, Addison-Wesley Publishing Co., Inc., 2nd Edition, pp. 545-546.
Fuchs et al.; "Fast Spheres, Shadows, Textures, Transparencies, and Image Enhancements in Pixel-Planes"; Siggraph '85; San Francisco Jul. 22-26, 1985; pp. 111-120; vol. 19, No. 3, 1985.
Seiler, Larry; "A Hardware Assisted Design Rule Check Architecture"; 19th Design Automation Conference, 1982, Paper 16.3; pp. 232-238; IEEE.
Pineda, Juan; "A Parallel Algorithm for Polygon Rasterization"; SIGGRAPH '88; Atlanta, Aug. 1-5, 1988; Computer Graphics, pp. 17-20; vol. 22, No. 4, Aug. 1988.
Gupta et al.; "A VLSI Architecture for Updating Raster-Scan Displays"; Computer Graphics, vol. 15, No. 3, Aug. 1981, pp. 71-78.
Non-Final Office Action Mail Date Dec. 18, 2012; U.S. Appl. No. 11/454,313.
Non-Final Office Action Mail Date Oct. 23, 2012; U.S. Appl. No. 11/474,161.
"Addressing the System-on-a-Chip Interconnect Woes Through Communication-Based Design" by Sgrol et al., DAC 2001, Jun. 18-22, 2001, copyright ACM.
"OSI Reference Model-The ISO Model of Architecture for Open Systems Interconnection," by Zimmermann, IEEE Transactions on Communicaions, Apr. 1980.
"SuperPaint: An Early Frame Buffer Graphics System", by Richard Shoup, IEEE Annals of the History of Computing, copyright 2001.
"Multimedia Processors" by Kuroda et al., Proceedings of the IEEE, Jun. 1998.
"Test Requirements for Embedded Core-based Systems and IEEE P1500" by Yervant Zorian, International Test Conference,copyright IEEE 1997.
PCI Express Card Electromechanical Specification Rev. 1.1, 2005, p. 87.

* cited by examiner

METHOD AND SYSTEM FOR REMAPPING PROCESSING ELEMENTS IN A PIPELINE OF A GRAPHICS PROCESSING UNIT

RELATED UNITED STATES PATENT APPLICATION

This application is related to U.S. patent application Ser. No. 10/876,340 by Michael Diamond, filed on Jun. 23, 2004, entitled "A System and Method for Testing and Configuring Semiconductor Functional Circuits", and assigned to the assignee of the present invention. To the extent not repeated herein, the contents of this related patent application are hereby incorporated herein by reference.

FIELD OF THE INVENTION

Embodiments of the present invention relate to graphics processors. More specifically, embodiments of the present invention relate to remapping pipelined processing elements in a pipeline of a graphics processor.

BACKGROUND ART

Graphics processing is an important feature of modern high performance computing systems. In graphic processing, mathematical procedures are implemented to render, or draw, graphic primitives, e.g., a triangle or a rectangle, on a display to produce desired visual images. Real time graphics processing requires high speed processing of graphic primitives to produce visually pleasing moving images.

The rendering of three-dimensional graphical images is of interest in a variety of electronic games and other applications. Rendering is the general term that describes the overall multi-step process of transitioning from a database representation of a three-dimensional object to a two-dimensional projection of the object onto a viewing surface, e.g., computer display.

The rendering process involves a number of steps, such as, for example, setting up a polygon model that contains the information which is subsequently required by shading/texturing processes, applying linear transformations to the polygon mesh model, culling back facing polygons, clipping the polygons against a view volume, scan converting/rasterizing the polygons to a pixel coordinate set and shading/lighting the individual pixels using interpolated or incremental shading techniques.

Graphics Processing Units (GPUs) are specialized integrated circuit devices that are commonly used in graphics systems to accelerate the performance of a 3-D rendering application. GPUs are commonly used in conjunction with a central processing unit (CPU) to generate three-dimensional images for one or more applications executing on a computer system. Modern GPUs typically utilize a graphics pipeline for processing data.

FIG. 1 illustrates a simplified block diagram of a graphics system 100 that includes a graphics processing unit 102. As shown, that graphics processing unit 102 has a host interface/front end 104. The host interface/front end 104 receives raw graphics data from central processing hardware 103 that is executing an application program stored in memory 105. The host interface/front end 104 buffers input information and supplies that information to a geometry engine 106. The geometry engine 106 produces, scales, rotates, and projects three dimensional vertices of graphics primitives in "model" coordinates into 2 dimensional frame buffer co-ordinates. Typically, triangles are used as graphics primitives for three dimension objects, but rectangles are often used for 2-dimensional objects (such as text displays).

The 2 dimensional co-ordinates of the vertices of the graphics primitives are supplied to a rasterizer 108. The rasterizer 108 determines the positions of all of the pixels within the graphics primitives. This is typically performed along raster (horizontal) lines that extend between the lines that define the graphics primitives. The rasterizer 108 also generates interpolated colors, depths and other texture coordinates for each pixel. The output of the rasterizer 108 is referred to as rasterized pixel data.

The rasterized pixel data are applied to a shader 110 that adds texture, color, and optical features related to fog and illumination to the rasterized pixel data to produce shaded pixel data. The shader 110 includes a texture engine 112 that modifies the rasterized pixel data to have desired texture and optical features. The texture engine 112 can be implemented using a hardware pipeline that can process large amounts of data at very high speed. The shaded pixel data is input to a Raster Operations Processor 114 (Raster op in FIG. 1) that performs color blending on the shaded pixel data. The result from the Raster Operations Processor 114 is frame pixel data that is stored in a frame buffer memory 120 by a frame buffer interface 116. The frame pixel data can be used for various processes such as being displayed on a display 122. Frame pixel data can be made available as required by way of the frame buffer interface 116.

The stages of the traditional GPU pipeline architecture illustrated in FIG. 1 may be typically optimized for high-speed rendering operations (e.g., texturing, lighting, shading, etc.) using a widely implemented graphics programming API (application programming interface), such as, for example, the OpenGL™ graphics language, Direct3D™, and the like. The architecture of the graphics processing unit 102 is configured as a multi-stage deep pipeline architecture in order to maximize the overall rendering throughput of the pipeline. Generally, deep pipeline architectures have sufficient data throughput (e.g., pixel fill rate, etc.) to implement fast, high quality rendering of even complex scenes.

A particular issue in the GPU processing unit of FIG. 1 is that manufacturing integrated circuits including the GPU is an expensive, resource intensive activity, in which numerous computational components are included in a single integrated circuit unit. Conventionally, integrated circuits are manufactured in wafers comprising a number of die, with each die comprising an integrated circuit having numerous functional components. The number of die that are functionally acceptable from a given wafer is referred to as the yield from the wafer. Yields for wafers with high performance die with a large number of components can be very low.

As a result, it is desirable to increase the yield for a given number of die in order to eliminate waste, save cost, and speed-up the effective manufacturing time.

SUMMARY OF THE INVENTION

Accordingly, the present invention provides, in various embodiments, a method and system for remapping processing elements to active units in a graphics processing unit. The present invention provides for higher yields when manufacturing the graphics processing unit by remapping defective processing elements. In addition, the present invention provides for more flexible testing of graphics processing units through the ability to disable processing elements that are not defective. Further, the present invention can promote the efficient use of processing elements in the graphics processing unit through the ability to enable and disable processing elements in a graphics processing unit.

Specifically, in one embodiment, a method is disclosed that remaps processing elements in a pipeline of a graphics processing unit. The method begins by accessing graphical input data at the beginning of the graphics processing unit. Then, the number of enabled processing elements from a plurality of processing elements that function identically is determined. Each of the enabled processing elements are virtually addressed above a translator to virtually process the graphical input data. The present method then maps each of the virtual addresses to physical addresses of each of the enabled processing elements at the translator. In that way, graphical input data are physically processed at the physical addresses of the enabled processing elements. Further, each of the enabled processing elements are physically addressed below the translator to further process the graphical input data.

In another embodiment, a system for remapping processing elements in a pipeline of a graphics processing unit is disclosed. The system includes a host, a cache distributor and a translator. The host receives graphical input data from a central processing unit (CPU). In addition, the host determines the number of enabled processing elements from a plurality of processing elements that function identically. The cache distributor is coupled to receive the graphical input data from the host. The cache distributor assigns the graphical input data to virtual addresses of cache entries in a memory cache that correspond with virtual representations of the enabled processing elements. The translator is coupled to receive the graphical input data from the cache distributor. The translator maps virtual addresses to physical addresses of the cache entries that correspond with the enabled processing elements. Additionally, the cache distributor processes the graphical input data at the virtual addresses of the cache entries. Moreover, modules below the translator in the vertex pipeline address physical addresses of cache entries that correspond to the enabled processing elements.

In its various embodiments, the present invention can significantly expand the functionality and yield of a graphics processing unit by remapping and disabling processing elements and taking care to not reference or send graphical input data to those processing elements that are disabled through the use of a mapping table. In particular, embodiments of the present invention are able to remap and disable processing elements in a graphics processing unit during testing to quickly isolate functional processing elements.

BRIEF DESCRIPTION OF THE DRAWINGS

The accompanying drawings, which are incorporated in and form a part of this specification, illustrate embodiments of the present invention and, together with the description, serve to explain the principles of the invention.

Prior Art

DETAILED DESCRIPTION OF THE INVENTION

Figure 1:
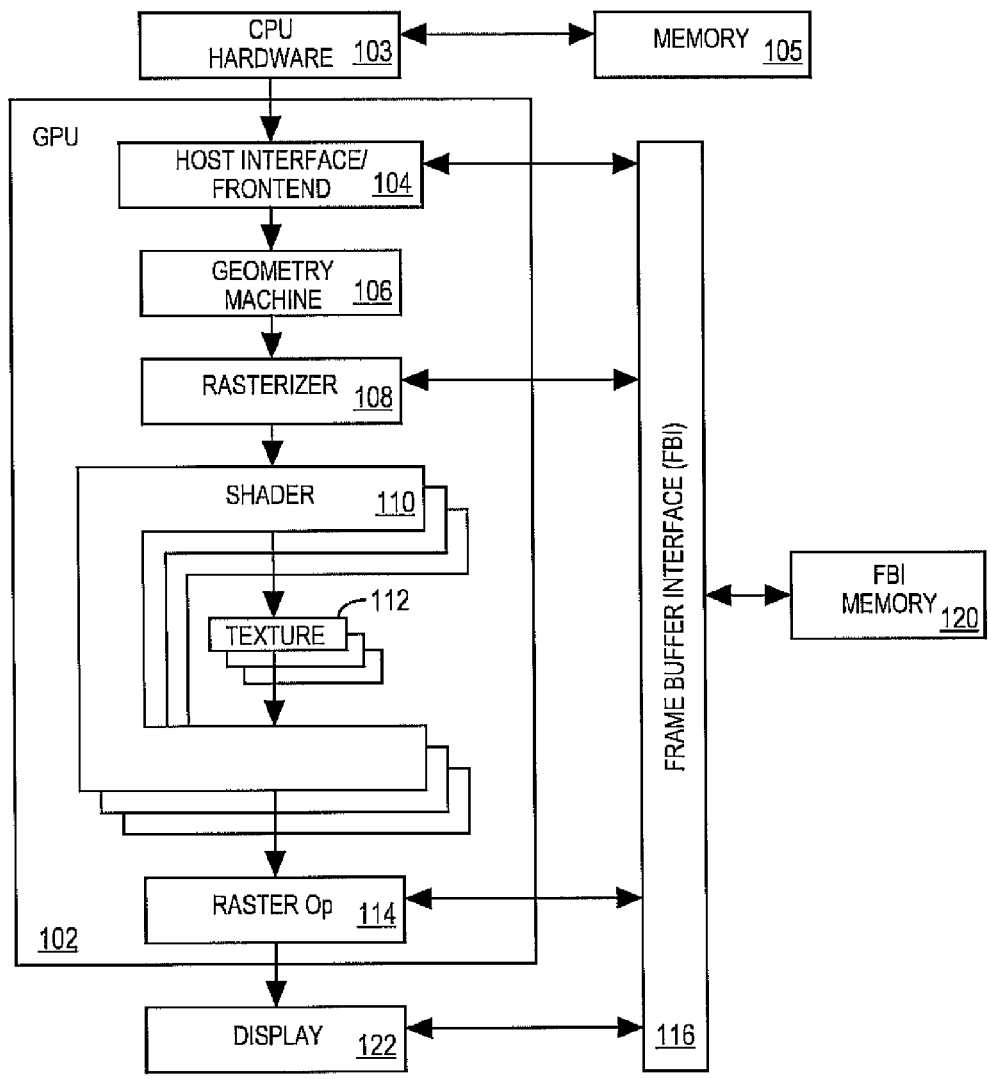
FIG. 1 shows a diagram depicting the various stages of a traditional prior art pipeline.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

In general, embodiments of the present invention are capable of remapping processing elements in a pipeline of a graphics processing unit. The graphics processing unit includes a 3-D graphics pipeline. Specifically, the present invention provides for higher yields when manufacturing the graphics processing unit by remapping defective processing elements. In addition, the present invention provides for more flexible testing of graphics processing units through the ability to disable processing elements that are not defective. Further, the present invention can promote the efficient use of pipelined, processing elements that function identically by enabling and disabling the processing elements in a graphics processing unit. Embodiments of the present invention and their benefits are further described below.

Although embodiments of the present invention are disclosed within a graphics pipeline, other embodiments are well suited for implementation within similar pipelines of varying nomenclature that render pixelated data, such as video pipelines, and the like, etc.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "determining," or "addressing," or "mapping," or "processing," or the like, refer to the action and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
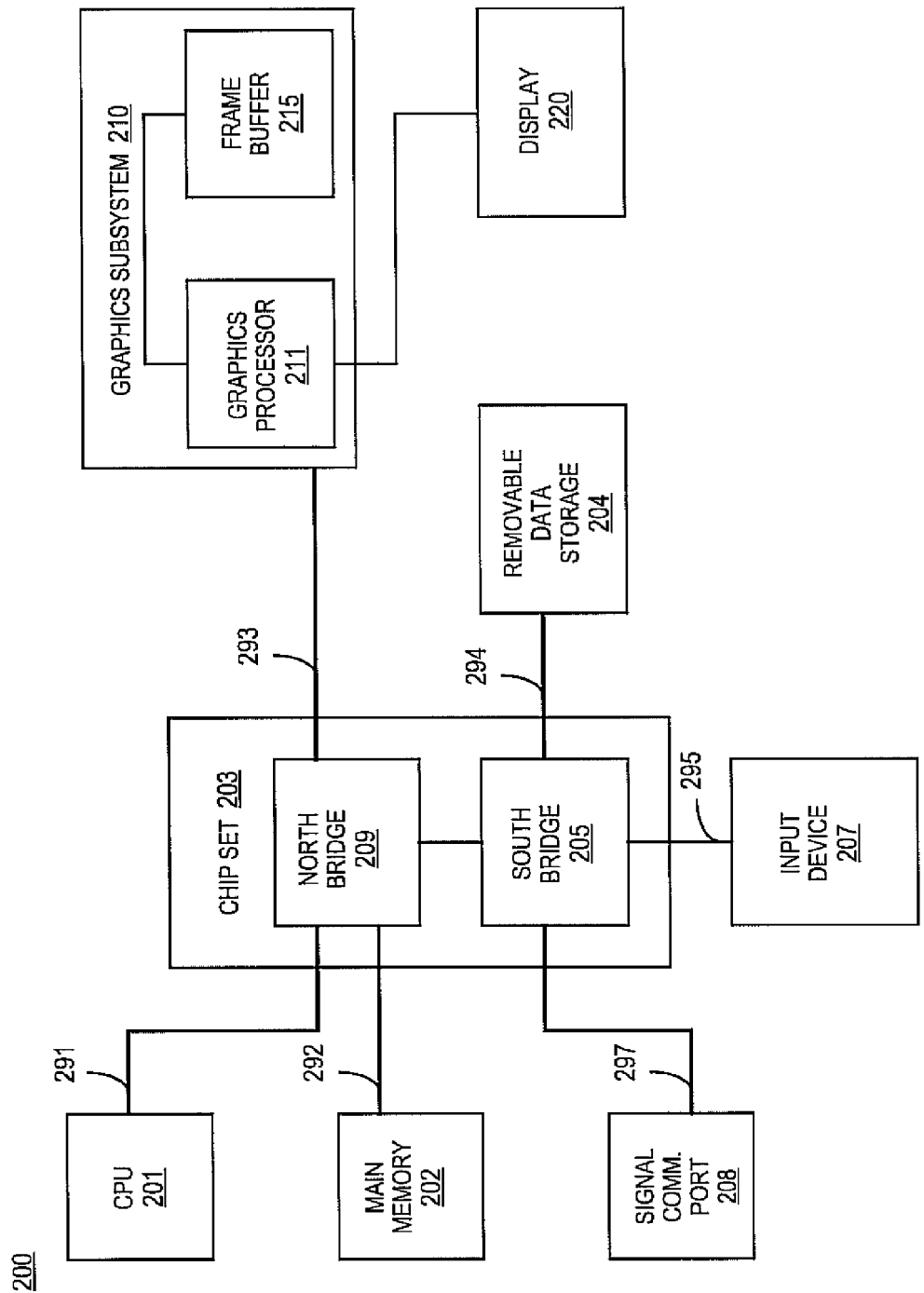
FIG. 2 is a block diagram of a computer system in which embodiments of the present invention can be implemented, in accordance with one embodiment of the present invention.

Computer System Platform:

With reference now to FIG. 2, a block diagram of an exemplary computer system 200 is shown upon which embodiments of the present invention can be implemented, in accordance with one embodiment of the present invention. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 293 (e.g., the Advanced Graphics Port interface) couples north bridge of chipset 203 to graphic subsystem 210. Communication buses 294-297 (e.g., PCI bus) couple south bridge 205 of chip set 203 to removable data storage device 204, input device 207, signal communications port 208, respectively. Graphics subsystem 210 includes graphics processor 211 and frame buffer 215.

The components of computer system 200 cooperatively operate to provide versatile functionality and performance. The operating characteristics of functional components included in computer system 200 can change dynamically. In one exemplary implementation, the components of computer system 200 cooperatively operate to provide predetermined types of functionality, even though some of the functional components included in computer system 200 may be defective. Communications bus 291, 292, 293, 294, 295 and 297 communicate information. Central processor 201 processes information. Main memory 202 stores information and instructions for the central processor 201. Removable data storage device 204 also stores information and instructions (e.g., functioning as a large information reservoir). Input device 207 provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Graphics processor 211 processes graphics commands from central processor 201 and provides the resulting data to graphics buffers 215 for storage and retrieval by display monitor 220.

The operational configurations of the functional components included in computer system 200 are flexibly adaptable to meet a variety of objectives. For example, operational configurations of the functional components included in computer system 200 are configurable to maintain execution of a type of function even if some of the functional components are disabled. In one exemplary implementation, central processor 201 and graphics processor 211 are still capable of executing the same type of processing functions and main memory 202 stores information even though some of the functional components (e.g., floating point component, pixel shader component, memory cell component, etc) are disabled. In one embodiment, the processors include a plurality of functional components for performing processing operations. The operational characteristics of the functional components can be altered. In one embodiment, the processors include a plurality of functional components for performing processing operations, wherein defective functional components included in the plurality of functional components are disabled. The processors also include a workflow control component for dispensing workflow to enabled processing components and preventing distribution of workflow to the disabled defective components. In one exemplary implementation, computer system 200 can continue to provide full functionality even though the functionality may be provided at a reduced performance level (e.g., slower).

It is appreciated that the present invention can be implemented in a variety of embodiments. In one exemplary implementation the present invention can be utilized in processing systems utilized to provide a variety of graphics applications including video games. For example, the present invention can be utilized to disable defective components in a game console, personal computer, personal digital assistant cell phone or any number of platforms for implementing a video game. It is also appreciated that references to video game application implementations are exemplary and the present invention is not limited to these implementations.

Method and System for Remapping Processing Elements in a Pipeline:

Accordingly, embodiments of the present invention are capable of remapping processing elements in a pipeline of a graphics processing unit. The processing elements can provide any pipelined functionality within the graphics processing unit. Although embodiments of the present invention are directed to generic processing elements, the following description is provided in relation to vertex processing engines (VPEs), as the processing element, in a vertex pipeline for illustration purposes only.

Figure 3A:
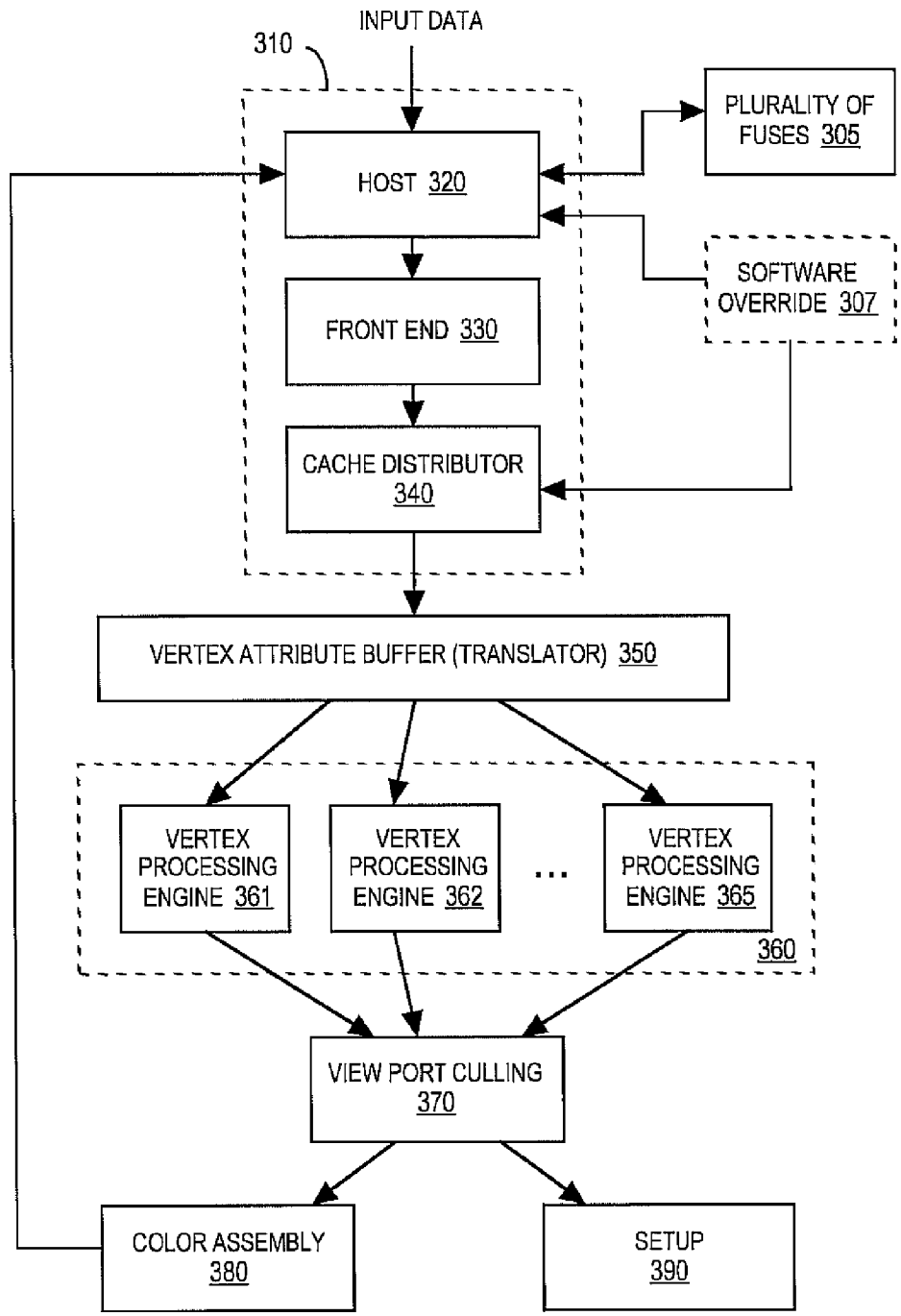
FIG. 3A is a block diagram illustrating a graphics pipeline unit capable of remapping references to active units, in accordance with one embodiment of the present invention.

FIG. 3A is a exemplary block diagram illustrating a system 300A for remapping VPEs in a vertex pipeline of a graphics processing unit, in accordance with one embodiment of the present invention. In general, the system 300A comprises a vertex pipeline suitable for receiving input data (e.g., raw graphics data) and producing two dimensional (2-D) coordinates of vertices of graphics primitives (e.g., triangles). That is, the vertex pipeline illustrated in FIG. 3A takes geometry data and projects the 3D data in a scene to 2D for a display. After the vertex pipeline is done processing the geometry, the 2D projected data is sent to the setup module 390 that then begins the pixelating process to transform the 2D graphic primitives to pixelated data for a display.

The system 300A includes a host/front end 310 that is, in part, analogous to the host interface/frontend 104 of FIG. 1. In general, the host/front end 310 receives input data (e.g., raw graphics data and instructions from a CPU) and sends the input data down the vertex pipeline of the graphics pipeline unit. In the present embodiment, the host/front end 310 includes a host 320, a front end 330, and a cache distributor 340.

The host/front end 310 performs multiple functions to move the input data through the vertex pipeline. For purposes of clarity, only those functions pertinent to the present invention are discussed. In the present embodiment, the host 320 receives graphical input data from a CPU. In addition, the host 320 determines the number of enabled VPEs from a plurality of VPEs that are available in a vertex pipeline of a graphics pipeline unit.

The plurality of VPEs that are enabled are referenced virtually by the host 320. That is, the host 320 does not know which physical VPEs of the plurality of VPEs are enabled, but does know the number of VPEs that are enabled, and references these virtually.

In one embodiment, the host 320 determines the number of enabled VPEs by accessing a plurality of fuses 305. Each of the plurality of fuses corresponds to a physical VPE. In the present embodiment, an intact fuse indicates that a corresponding VPE is enabled. Alternatively, a blown, or set, fuse indicates that a corresponding VPE is disabled. Typically, this process is irreversible.

In one embodiment, the VPEs are tested during the fabrication process to determine whether they meet specifications. Those VPEs that do not meet specifications can be disabled by setting a fuse. The fuse can be set by breaking a physical, electrical fuse connection, (e.g., by a laser) in one embodiment. In this manner, when a corresponding fuse is set, the defective VPE can be taken out of the vertex pipeline and is not used for processing data. That is, the defective VPE is remapped within the pipeline so that the defective VPE is not used for processing data.

The present embodiment is able to accommodate remapping of the VPEs in a vertex pipeline through the use of the plurality of fuses 305. For example, a defective VPE may be disabled so that units within the vertex pipeline will not reference the disabled VPE or send the disabled VPE any work. In addition, a VPE that is fully functional may be disabled to distinguish between similarly manufactured graphical processing units, or to promote efficiency.

In another embodiment, the host 320 determines the number of enabled VPEs through a software override 307. The software override 307 indicates the number of VPEs that are available for referencing and work. That is, the software override 307 indicates to the host 320 the number of VPEs that are enabled. In addition, the software override 307 indicates to the cache distributor 340 how many VPEs are enabled, which of the physical VPEs are enabled, and which are disabled. This process is reversible by disengaging the software override.

The host/front end 310 also includes an optional front end 330 that is coupled to the host 320. One of the functions of the front end 330 is to convert the graphical input data to a format compatible with the vertex pipeline, including the plurality of VPEs, and the remaining units of the graphics pipeline unit.

The host/front end 310 also includes a cache distributor 340 that is coupled to receive the graphical input data from the front end 330, or alternatively from the host 320. The cache distributor 340 assigns the graphical input data to each of the virtualized VPEs. As such, the cache distributor 340 is able to perform load balancing when assigning the graphical input data to the vertex pipeline for processing.

In one embodiment, the cache distributor 340 assigns and sends the graphical input data to virtual addresses of cache entries in a memory cache. Each of the virtualized cache entries correspond with virtual representations of the enabled VPEs, as will be fully described in FIG. 3B.

The system 300A also includes a vertex attribute buffer (VAB) 350 coupled to receive the graphical input data from the cache distributor 340. The VAB is coupled to the plurality of vertex processing engines 360 (VPE 361, VPE 362, on up to the n-th VPE 365). In particular, in the present embodiment, one of the functions of the VAB is to map the virtual addresses of the virtualized cache entries to physical addresses of the cache entries that correspond with the enabled VPEs. That is, the VAB acts as a translator. This is performed using a mapping or translation table, in one embodiment. As such, VAB 350 is capable of processing the graphical input data at the physical addresses of the cache entries representative of the physical VPEs. That is, the graphical input data is processed at the physical VPEs that are enabled. The VPEs perform mathematical operations on the vertices of the polygon shape (e.g., triangles) used for producing graphics primitives. That is, the VPEs can place, orient, animate, color, and light every object and surface that needs to be drawn in an image. As such, the VAB 350 in combination with the vertex processing engines generate and maintain a plurality of vertex attribute states (e.g., position, normal, colors, texture coordinates, etc.) for the graphics primitives.

In addition, for all following units down the vertex pipeline and the remaining units in the graphics pipeline unit, only physical addresses to the cache entries corresponding to the enabled VPEs are used. In this way, these following units can treat the plurality of VPEs as if none of them were removed or disabled. That is, no change to the following units need to be implemented, since these units are only given reference to physical VPEs as designed. Specifically, modules below the VAB 350 in the vertex pipeline address the physical addresses of the cache entries. As such, none of the references to VPEs to and from these downstream units will access a disabled VPE, because references to the disabled VPE are not sent down the vertex pipeline. That is, to these downstream units, it appears as if the disabled VPEs are idle.

Now referring to some downstream modules in the vertex pipeline, the system 300A also includes a view port culling module (VPC) 370 that is coupled to receive processed graphics data from the plurality of VPEs 360. One of the functions of the VPC 370 is to cull processed graphics data corresponding to triangles that are not viewed on the display. For example, the VPC 370 is able to perform back face culling, which discards triangles that are facing away from the view camera and will not be displayed.

The system 300A also includes a color assembly module 380. The color assembly module 380 is coupled to receive the processed graphics data from the VPC 370 for assembling color data in the vertex pipeline. That is, color data from each of the VPEs are assembled and assigned to corresponding triangles to create the image.

The system 300A also includes a setup module 390 that is coupled to receive the processed graphics data for pixelating the processed graphics data. That is, the setup module 390 begins the process for transforming the graphics primitives to be displayed on pixels of a display. The setup module 390 begins the remaining process implemented by the graphics pipeline unit, to include, in part, rasterizing, texture mapping, fogging, alpha blending, etc.

Figure 3B:
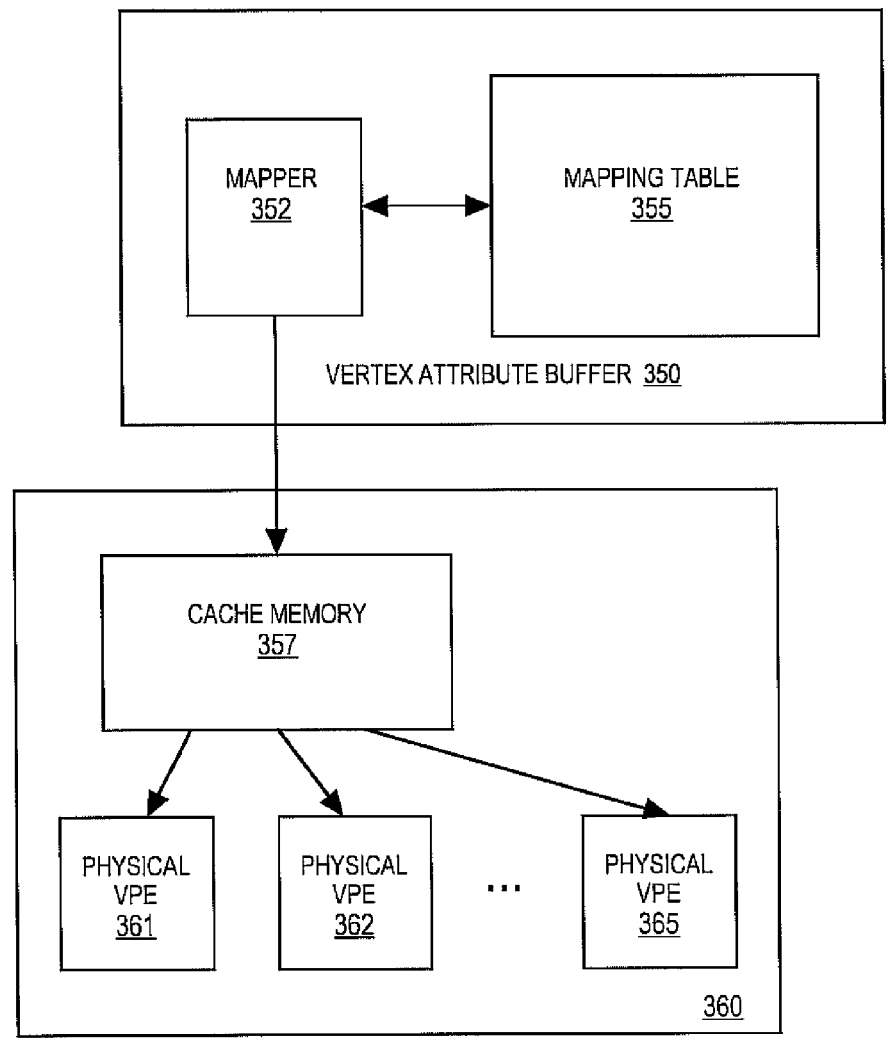
FIG. 3B is a block diagram illustrating a vertex attribute buffer that translates virtual to physical addresses of vertex processor engines by using a mapping table, in accordance with one embodiment of the present invention.

Now referring to FIG. 3B, a block diagram illustrates the VAB 350 and the plurality of VPEs 360 in more detail. The VAB 350 includes a mapper 352 for accessing a mapping table 355. The mapper 352 maps the virtual representations of the virtualized VPEs that are enabled to physical addresses of the plurality of VPEs, and more specifically, to physical representations of the VPEs that are enabled. That is, the mapper 352 in the VAB 350 is able to translate references to virtualized VPEs by units above the VAB 350 (e.g., the host 320, front end 330, and cache distributor 340) to references to physical VPEs for units below the VAB 350.

Specifically, the VAB 350 maps the references to virtual addresses of the virtualized cache entries made by the units above the VAB (e.g., cache distributor 340) to physical addresses of the cache entries that correspond with the enabled VPEs. That is, the VAB 350 translates the virtual addresses to physical addresses. Translation is enabled through the mapper 352 in the VAB 350, in one embodiment. The mapper 352 in the VAB 350 accesses the mapping table 355 to map virtual addresses of virtualized cache entries to physical addresses of physical cache entries in a cache memory 357 that correspond with the enabled VPEs on a one-to-one basis. As shown in FIG. 3B, the mapper 352 is coupled to the cache memory 357.

The cache memory 357 includes cache entries that each correspond to the plurality of VPEs that support the vertex pipeline (e.g., VPE 361, 362, on up to the n-th VPE 365). For example, each of the plurality of VPEs 360 correspond to eight entries in the cache memory 357, in one exemplary embodiment. Other embodiments are well suited to any number of cache entries that correspond to a particular VPE. Graphics data is loaded into the cache entries of the cache memory 357 for processing by the corresponding VPEs. By setting the cache entries to the VPEs appropriately, load balancing can be achieved.

Table 1 illustrates exemplary entries for the mapping table 355 in the case where all the physical VPEs of a vertex pipeline are enabled. For instance, if the vertex pipeline includes six VPEs, each of which are associated with 8 cache entries, then there are 48 cache entries in the mapping table 355. In Table 1, sequential references from the cache distributor 340 are translated to the cache entries and the VPEs that are enabled in a round robin fashion. For example, as work is being distributed to the VPEs, a reference to virtual cache entry 0 by the cache distributor 340 is mapped to a reference to physical cache entry 0 by the VAB 350 and units below the VAB 350. A reference to virtual cache entry 1 by the cache distributor 340 is mapped to a reference to physical cache entry 1 by the VAB 350 and units below the VAB 350, and so on. Since all the VPEs are enabled, the mapping repeats every six cache entries. Other embodiments are well suited to load balancing using other load balancing schemes, such as random assigning, or assigning consecutive cache entries to one VPE, etc.

TABLE 1

Entries for Mapping Table with all VPEs Enabled

| Virtual Cache Entry | Physical Cache Entry | Corresponding Virtual VPE | Corresponding Physical VPE |
|---|---|---|---|
| 0 | 0 | VPE-0 | VPE-0 |
| 1 | 1 | VPE-1 | VPE-1 |
| 2 | 2 | VPE-2 | VPE-2 |
| 3 | 3 | VPE-3 | VPE-3 |
| 4 | 4 | VPE-4 | VPE-4 |
| 5 | 5 | VPE-5 | VPE-5 |
| 6 | 6 | VPE-0 | VPE-0 |
| 7 | 7 | VPE-1 | VPE-1 |
| 8 | 8 | VPE-2 | VPE-2 |
| 9 | 9 | VPE-3 | VPE-3 |
| * * * | * * * | * * * | * * * |
| 42 | 42 | VPE-0 | VPE-0 |
| 43 | 43 | VPE-1 | VPE-1 |
| 44 | 44 | VPE-2 | VPE-2 |
| 45 | 45 | VPE-3 | VPE-3 |
| 46 | 46 | VPE-4 | VPE-4 |
| 47 | 47 | VPE-5 | VPE-5 |

Figure 4:
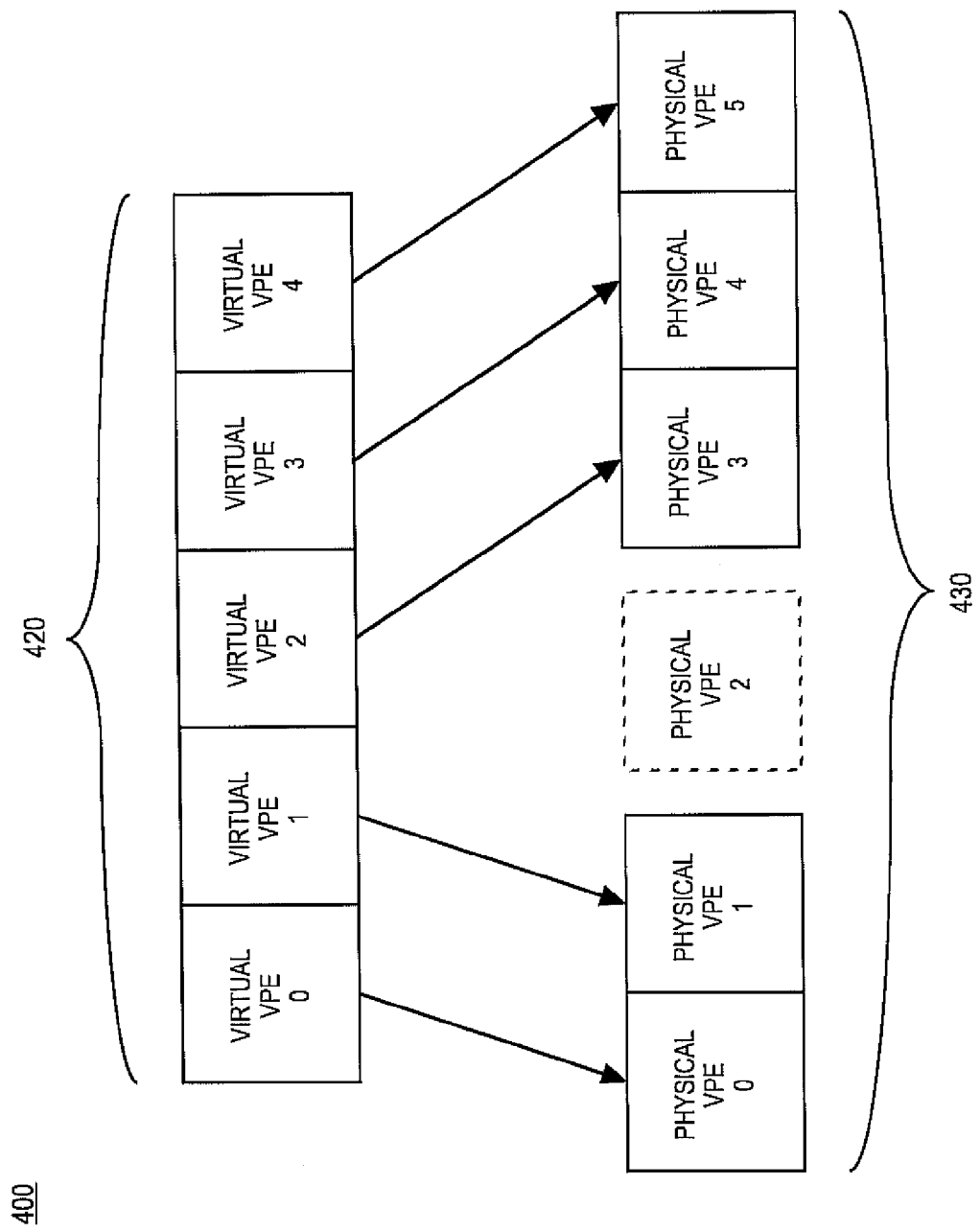
FIG. 4 is a diagram illustrating the remapping of virtual vertex processing engines to physical processing engines, in accordance with one embodiment of the present invention.

In another example, FIG. 4 illustrates the mapping between the virtualized VPEs 410 and the physical VPEs 420 in which a physical VPE is disabled. As shown in FIG. 4, in a VAB 350 that is able to access six physical VPEs (VPE-0, VPE-1, VPE-2, VPE-3, VPE-4, and VPE-5), only five VPEs are enabled. In FIG. 4, the physical VPE-2 is disabled, as shown by the dotted lines surrounding the physical representation of VPE-2.

As such, virtually there are five VPEs that are enabled. The virtualized VPEs are as follows: VPE-0, VPE-1, VPE-2, VPE-3, and VPE-4. These virtualized VPEs are referenced by the units above the VAB 350 (e.g., host 320, front end 330, and cache distributor 340). Virtually, there is no reference to a sixth possible VPE that was disabled, since those units above the VAB 350 treat VPEs virtually and only are aware of the number of VPEs that are enabled. That is, these units do not necessarily also know the total number of VPEs in the plurality of VPEs 360 that support the vertex pipeline. As such, the units above the VAB 350 only reference the virtual addresses of the five virtualized VPEs. As described previously, in one case, the virtual addresses for a virtualized VPE correspond to virtual cache entries.

Table 2 illustrates exemplary entries for the mapping table 355 in the case where one VPE is disabled (e.g., physical VPE 2) in a plurality of six VPEs of a vertex pipeline. In Table 2, for instance, if each of the six VPEs is associated with 8 cache entries, then there are 48 cache entries in the mapping table 355. However, since physical VPE-2 is disabled, only 40 cache entries are used in the mapping table 355. As in Table 1, sequential references from the cache distributor (e.g., cache distributor 340 of FIG. 3A) are translated to the cache entries and the VPEs that are enabled in a round robin fashion. For example, as work is being distributed to the VPEs, a reference to virtual cache entry 0 by the cache distributor 340 is mapped to a reference to physical cache entry 0 (physical VPE-0) by the VAB 350 and units below the VAB 350. A reference to virtual cache entry 1 by the cache distributor 340 is mapped to a reference to physical cache entry 1 (physical VPE-1) by the VAB 350 and units below the VAB 350. Cache entries for physical VPE-2 are skipped since physical VPE-2 is disabled. As such, a reference to virtual cache entry 2 by the cache distributor 340 is mapped to a reference to physical cache entry 3 (physical VPE-3) by the VAB 350 and units below the VAB 350, and so on. As shown in Table 2, the physical cache entries corresponding to VPE-2 that is disabled are not referenced.

TABLE 2

Entries for Mapping Table with 5 of 6 VPEs Enabled

| Virtual Cache Entry | Physical Cache Entry | Corresponding Virtual VPE | Corresponding Physical VPE |
|---|---|---|---|
| 0 | 0 | VPE-0 | VPE-0 |
| 1 | 1 | VPE-1 | VPE-1 |
| 2 | 3 | VPE-2 | VPE-3 |
| 3 | 4 | VPE-3 | VPE-4 |
| 4 | 5 | VPE-4 | VPE-5 |
| 5 | 6 | VPE-0 | VPE-0 |
| 6 | 7 | VPE-1 | VPE-1 |
| 7 | 9 | VPE-2 | VPE-3 |
| 8 | 10 | VPE-3 | VPE-4 |
| 9 | 11 | VPE-4 | VPE-5 |
| * * * | * * * | * * * | * * * |
| 35 | 42 | VPE-0 | VPE-0 |
| 36 | 43 | VPE-1 | VPE-1 |
| 37 | 45 | VPE-2 | VPE-3 |
| 38 | 46 | VPE-3 | VPE-4 |
| 39 | 47 | VPE-4 | VPE-5 |

Figure 5:
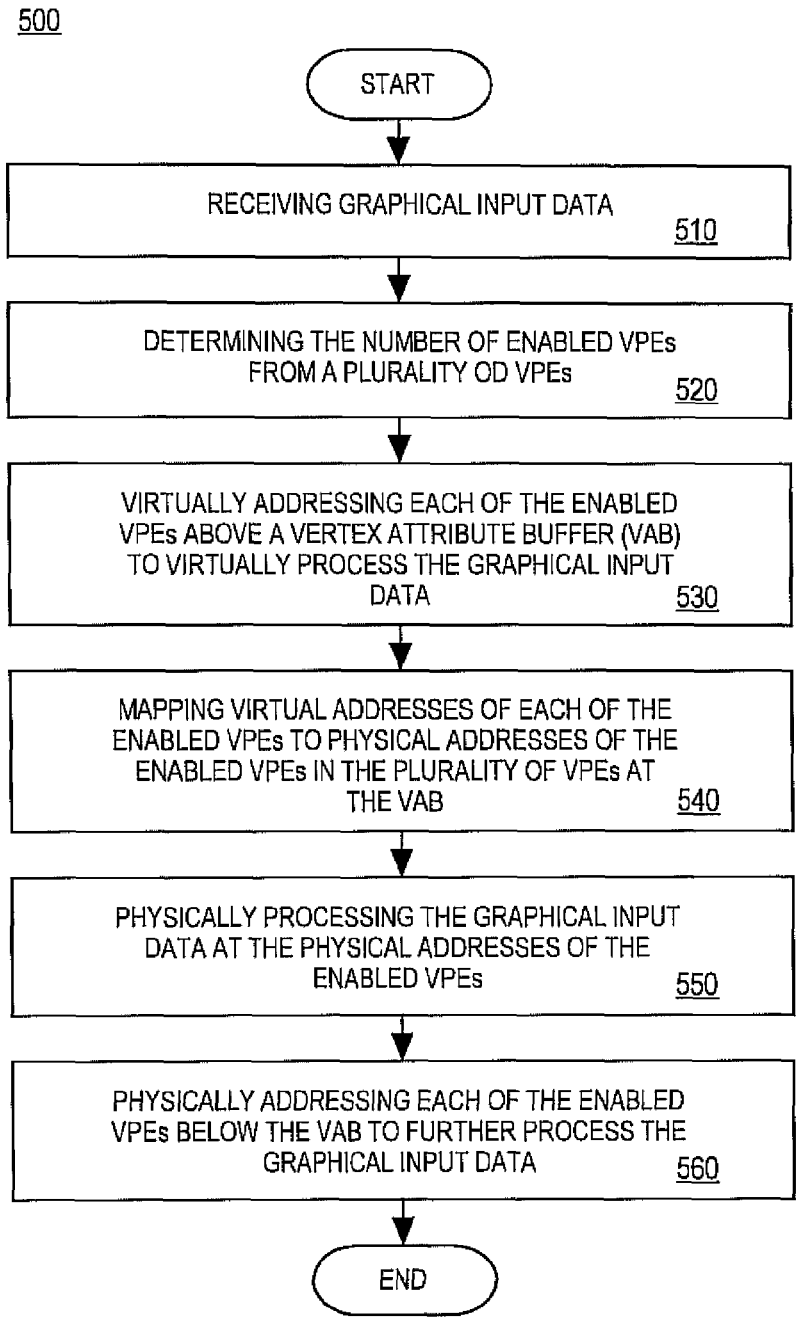
FIG. 5 is a data flow diagram illustrating the process for remapping references to active units, in accordance with one embodiment of the present invention.

FIG. 5 is a flow chart 500 illustrating a process for remapping VPEs in a vertex pipeline of a graphics processing unit, in accordance with one embodiment of the present invention.

The present embodiment is implemented to ensure that VPEs that are removed or disabled are not referenced or given data to process. This is efficiently accomplished by virtually referencing VPEs in a vertex pipeline above a VAB, and physically referencing the VPEs below the VAB. As such, the VAB performs the translation between the virtual and physical domains.

At 510, the present embodiment receives the graphical input data. For instance, the graphical input data includes the raw graphics data from the CPU that is executing an application program. The graphical input data can include instructions for processing the graphical input data through the vertex pipeline.

In one embodiment, before accessing the graphical input data, a first VPE from the plurality of VPEs is removed or disabled. That is, the first VPE is disabled. In one case, the first VPE is removed or disabled by blowing (e.g., setting) a validity fuse that corresponds to the first VPE. When the validity fuse or memory cell is blown (e.g., set), the first VPE is disabled. In another case, the first VPE is removed or disabled through a software override. The software override provides for re-enabling the VPE by disengaging the software override. This is useful for testing purposes, for example.

At 520, the present embodiment determines the number of enabled VPEs from a plurality of VPEs. The plurality of VPEs support the vertex pipeline. By referencing virtualized VPEs, a better approach to remapping VPEs that are disabled is achieved, since each of the units in the vertex pipeline do not need logic to determine which of the VPEs are enabled and which of the VPEs are disabled in order to reference the enabled VPEs.

In one embodiment, the number of enabled VPEs is determined by checking the status of a corresponding validity fuse for each of the plurality of VPEs. In one case, a blown, or set, fuse indicates a VPE is disabled, and an intact fuse indicates an enabled VPE. Other embodiments are well suited to reversing the status of a VPE when checking the fuses. In another case, the number of enabled VPEs is determined by recognizing a software override that indicates how many VPEs are disabled in the plurality of VPEs.

More specifically, the present embodiment determines the number of cache entries that correspond to the enabled VPEs. As such, the present embodiment is able to virtually address the VPEs by virtually addressing the corresponding cache entry.

By virtually addressing the VPEs, only the number of VPEs that are enabled need be known at this stage. As such, at 530, the present embodiment virtually addresses each of the enabled VPEs above a VAB to virtually process the graphical input data. That is, the present embodiment is able to perform load balancing of the graphical input data between the enabled VPEs. More specifically, load balancing can be performed when translating sequential references (data and instructions) from the cache distributor for distribution between the cache entries and corresponding VPEs.

At 540, the present embodiment maps the virtual addresses of each of the enabled VPEs that are virtualized to physical addresses of the enabled VPEs in the plurality of VPEs at the VAB. That is, the present embodiment, maps virtual representations of cache entries in a cache memory corresponding to the enabled VPEs that are virtualized to physical representations of the cache entries in the cache memory corresponding to the enabled VPEs. As such, references to the enabled VPEs are translated from the virtualized addresses of the cache entries that are virtualized to a physical address of physical cache entries by using a translation or mapping table.

In the present embodiment, there is a one-to-one mapping of the virtual cache entries to the physical cache entries.

In one embodiment, load balancing is performed by setting the mapping table appropriately, as described previously. For instance, sequential references from the cache distributor in the vertex pipeline can be translated in a round robin fashion to distribute the graphical input data between the cache entries of the VPEs that are enabled.

In still another embodiment, context switching is provided through the use of the mapping table. That is, states of the plurality of VPEs can be stored for context switching between different windows of a display. As such, varying numbers of VPEs can be employed depending on the context status of the VPEs that are enabled.

In still another embodiment, the efficient use of VPEs is possible by enabling and disabling VPEs in a graphics processing unit depending on the load on the graphics processing unit. That is, if the load is light, then fewer numbers of VPEs need to be used to process the graphical input data. On the other hand, if the load is heavy, then a greater number of VPEs need to be used to process the graphical input data. This is accomplished using the mapping table.

At 550, the present embodiment physically processes the graphical input data at the physical addresses of the enabled VPEs. In addition, at 560, the present embodiment physically addressing each of the enabled VPEs, and their corresponding cache entries, below the VAB to further process the graphical input data. By using the mapping table, references to the VPEs at each of the units in the vertex pipeline and the graphical processing unit is more efficient since only one unit, the VAB, need only contain logic for determining which VPEs are removed or disabled. That is, units above the VAB reference only the virtualized VPEs and units below the VAB reference the physical VPE. The VAB provides the necessary translation between the virtual and physical domains.

As an advantage, the present embodiment is capable of increasing yields of a manufactured chip by remapping VPEs that are disabled for various reasons (product differentiation, defective VPEs, etc.). In addition, in the testing environment, VPEs that are fully functional can be disabled and re-enabled for testing to determine performance impact of varying numbers of VPEs in the vertex pipeline.

Accordingly, the present invention provides, in various embodiments, a method and system for remapping processing elements in a pipeline of a graphics processing unit. The present invention provides for higher yields when manufacturing the graphics processing unit by disabling and remapping defective vertex processing engines. In addition, the present invention provides for more flexible testing of graphics processing units through the ability to disable vertex processing engines that are not defective. Further, the present invention can promote the efficient use of vertex processing engines in the graphics processing unit through the ability to enable and disable vertex processing engines in a graphics processing unit.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method of remapping processing elements in a pipeline of a graphics processing unit, comprising:
   a host of said pipeline of said graphics processing unit receiving graphical input data from a central processing unit;
   after said receiving, the host determining a number of enabled processing elements from a plurality of processing elements in said pipeline that perform identical functions, said plurality of processing elements for animating, coloring, and lighting a surface of an image;
   a front end receiving said graphical input data from said host, said front end is coupled to said host;
   said front end converting said graphical input data to a format compatible with said pipeline of said graphics processing unit;
   after said converting, a cache distributor receiving said graphical input data from said front end, said cache distributor is coupled to said front end;
   virtually addressing each of said enabled processing elements above a translator to virtually process said graphical input data;
   said translator receiving said graphical input data from said cache distributor;
   said translator mapping virtual addresses of each of said enabled processing elements to physical addresses of said enabled processing elements in said plurality of processing elements, said mapping comprises using a translation table, said translator is coupled to said cache distributor;
   physically processing said graphical input data at said physical addresses of said enabled processing elements, said plurality of processing elements are coupled to said translator; and
   physically addressing each of said enabled processing elements below said translator to further process said graphical input data.

2. The method of claim 1, further comprising:
   before said receiving said graphical input data, disabling a first processing element by setting a validity fuse corresponding to said first processing element; and
   wherein said determining a number of enabled processing elements comprises checking status of a corresponding validity fuse for each of said plurality of processing elements, wherein a set fuse indicates a processing element that is disabled, and an intact fuse indicates an enabled processing element.

3. The method of claim 2, wherein said setting said validity fuse comprises breaking a physical, electrical fuse connection.

4. The method of claim 1, further comprising:
   before said receiving said graphical input data, disabling a first processing element through a software override; and
   wherein said determining a number of enabled processing elements comprises recognizing said software override that indicates said first processing element is disabled.

5. The method of claim 4, further comprising:
   reenabling said first processing element by disengaging said software override.

6. The method of claim 1, wherein said mapping virtual addresses comprises:
   mapping virtual representations of cache entries in a cache memory corresponding to said enabled processing elements that are virtualized to physical representations of said cache entries in said cache memory corresponding to said processing elements.

7. The method of claim 6, wherein said mapping is a one-to-one relationship between virtual representations and physical representations of cache entries in said cache memory.

8. The method of claim 6, wherein said mapping virtual addresses further comprises:
   load balancing said virtual representations of cache entries between cache entries corresponding to said enabled processing elements.

9. The method of claim 6, wherein said mapping virtual addresses further comprises:
   assigning randomly said virtual representations of cache entries between cache entries corresponding to said enabled processing elements.

10. The method of claim 1, wherein said plurality of processing elements comprises a plurality of vertex processing engines (VPE), and said pipeline comprises a vertex pipeline.

11. The method of claim 1, wherein said translator comprises a vertex attribute buffer (VAB).

12. A system for remapping processing elements in a pipeline of a graphics processing unit comprising:
    a host of said pipeline for receiving graphical input data from a central processing unit, said host for determining a number of enabled processing elements from a plurality of processing elements in said pipeline that each perform identical functions, said plurality of processing elements for animating, coloring, and lighting a surface of an image;
    a front end for receiving said graphical input data from said host, said front end is coupled to said host, said front end for converting said graphical input data to a format compatible with said pipeline of said graphics processing unit;
    a cache distributor coupled to receive said graphical input data from said front end, and said cache distributor for assigning said graphical input data to virtual addresses of cache entries in a memory cache that correspond with virtual representations of said enabled processing elements; and
    a translator coupled to receive said graphical input data from said cache distributor, and said translator for using a translation table for mapping said virtual addresses of said cache entries to physical addresses of said cache entries that correspond with said enabled processing elements and for processing said graphical input data at said physical addresses of said cache entries, wherein modules below said translator in said pipeline address said physical addresses of said cache entries, said plurality of processing elements are coupled to said translator.

13. The system of claim 12, wherein said plurality of processing elements comprises a plurality of vertex processing engines (VPEs), said pipeline comprises a vertex pipeline, and wherein said translator comprises a vertex attribute buffer (VAB).

14. The system of claim 13, further comprising:
    a view port culling module coupled to receive processed graphics data from said plurality of vertex processing engines for performing back face culling;
    a color assembly module coupled to receive said processed graphics data that is back faced culled from said view port culling module for assembling color data in said vertex pipeline; and a setup module coupled to receive said processed graphics data that is back faced culled from said view port culling module for pixelating said processed graphics data.

15. The system of claim 13, wherein said color assembly module is coupled to said host.

16. The system of claim 13, wherein said VAB further comprises a mapper using a mapping table for mapping said virtual addresses of said cache entries to said physical addresses of said cache entries that correspond with said enabled VPEs.

17. The system of claim 13, wherein said cache distributor is for randomly assigning said graphical input data between said virtual and physical addresses of said cache entries corresponding with said enabled VPEs.

18. The system of claim 12, further comprising:
a view port culling module coupled to receive processed graphics data from said plurality of processing elements for performing back face culling.

19. A computer system comprising:
a central processing unit for processing information; and
a computer readable memory coupled to said central processing unit and containing program instructions that implement a method of remapping processing elements in a pipeline of a graphics processing unit, comprising:
a host of said pipeline of said graphics processing unit receiving graphical input data from said central processing unit;
after said receiving, the host determining a number of enabled processing elements from a plurality of processing elements in said pipeline of said graphics processing unit that perform identical functions, said plurality of processing elements for animating, coloring, and lighting a surface of an image;
a front end receiving said graphical input data from said host, said front end is coupled to said host;
said front end converting said graphical input data to a format compatible with said pipeline of said graphics processing unit;
after said converting, a cache distributor receiving said graphical input data from said front end, said cache distributor is coupled to said front end;
virtually addressing each of said enabled processing elements above a translator to virtually process said graphical input data;
said translator receiving said graphical input data from said cache distributor;
said translator mapping virtual addresses of each of said enabled processing elements to physical addresses of said enabled processing elements in said plurality of processing elements, said mapping comprises using a mapping table, said translator is coupled to said cache distributor;
physically processing said graphical input data at said physical addresses of said enabled processing elements, said plurality of processing elements are coupled to said translator; and
physically addressing each of said enabled processing elements below said translator to further process said graphical input data.

20. The computer system of claim 19, said method further comprising:
before said receiving said graphical input data, disabling a first processing element by setting a validity fuse corresponding to said first processing element; and
wherein said determining a number of enabled processing elements comprises checking status of a corresponding validity fuse for each of said plurality of processing elements, wherein a set fuse indicates a processing element that is disabled, and an intact fuse indicates an enabled processing element.

21. The computer system of claim 20, wherein said setting said validity fuse comprises breaking a physical, electrical fuse connection.

22. The computer system of claim 19, said method further comprising:
before said receiving said graphical input data, disabling a first processing element through a software override; and
wherein said determining a number of enabled processing elements comprises recognizing said software override that indicates said first processing element is disabled.

23. The computer system of claim 22, said method further comprising:
reenabling said first processing element by disengaging said software override.

24. The computer system of claim 19, wherein said mapping virtual addresses comprises:
mapping virtual representations of cache entries in a cache memory corresponding to said enabled processing elements that are virtualized to physical representations of said cache entries in said cache memory corresponding to said processing elements.

25. The computer system of claim 24, wherein said mapping is a one-to-one relationship between virtual representations and physical representations of cache entries in said cache memory.

26. The computer system of claim 24, wherein said mapping virtual addresses further comprises:
load balancing said virtual representations of cache entries between cache entries corresponding to said enabled processing elements.

27. The computer system of claim 26, wherein said load balancing comprises:
load balancing said virtual representations of cache entries by assigning consecutive cache entries to one of said enabled processing elements.

28. The computer system of claim 19, wherein said plurality of processing elements comprises a plurality of vertex processing engines (VPE), and said pipeline comprises a vertex pipeline.

29. The computer system of claim 19, wherein said translator comprises a vertex attribute buffer (VAB).

* * * * *